US011671710B2

(12) United States Patent
Sung et al.

(10) Patent No.: US 11,671,710 B2
(45) Date of Patent: Jun. 6, 2023

(54) FOLDABLE ELECTRONIC DEVICE HAVING ROTATABLE CAMERA AND METHOD FOR CAPTURING IMAGES THEREBY

(71) Applicant: Samsung Electronics Co., Ltd., Gyeonggi-do (KR)

(72) Inventors: Wonkyu Sung, Gyeonggi-do (KR); Jungwon Lee, Gyeonggi-do (KR); Jinhoo Lee, Gyeonggi-do (KR); Daehyeong Park, Gyeonggi-do (KR); Yonghwa Han, Gyeonggi-do (KR); Minwoo Yoo, Gyeonggi-do (KR); Hyoungwook Yi, Gyeonggi-do (KR); Jongchul Choi, Gyeonggi-do (KR); Changryong Heo, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/836,216

(22) Filed: Jun. 9, 2022

(65) Prior Publication Data
US 2022/0303473 A1    Sep. 22, 2022

Related U.S. Application Data

(63) Continuation of application No. PCT/KR2020/017759, filed on Dec. 7, 2020.

(30) Foreign Application Priority Data

Dec. 9, 2019    (KR) .................. 10-2019-0162582

(51) Int. Cl.
*H04N 23/695*    (2023.01)
*G06F 1/16*    (2006.01)
*H04N 23/57*    (2023.01)
(Continued)

(52) U.S. Cl.
CPC ......... *H04N 23/695* (2023.01); *G06F 1/1641* (2013.01); *H04N 23/531* (2023.01);
(Continued)

(58) Field of Classification Search
CPC ............... H04N 5/2251; H04N 5/2252; H04N 5/2257; H04N 5/22525; H04N 5/225251;
(Continued)

(56) References Cited

U.S. PATENT DOCUMENTS

2001/0005454 A1* 6/2001 Nishino ............. H04M 1/0218
348/E7.079
2018/0292866 A1* 10/2018 Tucker .................. H04N 23/57
(Continued)

FOREIGN PATENT DOCUMENTS

CN    110365904 A    10/2019
CN    110445981 A    11/2019
(Continued)

*Primary Examiner* — Paul M Berardesca
(74) *Attorney, Agent, or Firm* — Cha & Reiter, LLC

(57) ABSTRACT

A foldable electronic device is disclosed, including a first housing and a second housing coupled via a hinge allowing folding thereof, a camera configured to rotate with respect to the first housing to a change a field-of-view (FOV) of the camera, a display spanning across surfaces of the first and second housings, a motion sensor for detecting a posture of the foldable electronic device, a folding angle sensor for detecting a folding angle between the first and second housings, and at least one processor configured to: based on detecting an input requesting a function associated with photographic capture by the camera, detect a present posture via the motion sensor and a present folding angle via the folding angle sensor, and drive rotation of the camera, based on the detected present posture and the present folding angle, so as to adjust a present FOV of the camera.

15 Claims, 24 Drawing Sheets

(51) Int. Cl.
*H04N 23/63* (2023.01)
*H04N 23/667* (2023.01)
*H04N 23/53* (2023.01)
*H04N 23/58* (2023.01)

(52) U.S. Cl.
CPC ............. *H04N 23/57* (2023.01); *H04N 23/58* (2023.01); *H04N 23/632* (2023.01); *H04N 23/667* (2023.01)

(58) Field of Classification Search
CPC .......... H04N 5/2259; H04N 5/23293–232945; H04N 5/23299; H04N 23/50; H04N 23/51; H04N 23/57; H04N 23/53; H04N 23/531; H04N 23/58; H04N 23/63–635; H04N 23/695; G03B 13/00–16; G03B 17/00–17; G03B 30/00; H04M 1/0264; H04M 1/0268; H04M 1/0269; G06F 1/1616; G06F 1/1618; G06F 1/162; G06F 1/1622; G06F 1/1641; G06F 1/1652
See application file for complete search history.

(56) References Cited

U.S. PATENT DOCUMENTS

| | | |
|---|---|---|
| 2019/0339745 A1 | 11/2019 | Chen |
| 2020/0012324 A1 | 1/2020 | Sung et al. |
| 2021/0018957 A1* | 1/2021 | Cho .................... G06F 3/04845 |
| 2021/0096675 A1* | 4/2021 | Klein .................... G06F 1/1694 |
| 2022/0116533 A1* | 4/2022 | Yan ........................ H04N 23/62 |

FOREIGN PATENT DOCUMENTS

| | | | |
|---|---|---|---|
| CN | 110545368 A | | 12/2019 |
| CN | 111610821 A | * | 9/2020 |
| KR | 10-2017-0004532 A | | 1/2017 |
| KR | 10-2020-0005211 A | | 1/2020 |
| TW | 201102751 A | * | 1/2011 |
| WO | WO-2005099234 A1 | * | 10/2005 ............ H04M 1/021 |
| WO | WO-2020050845 A1 | * | 3/2020 |

\* cited by examiner

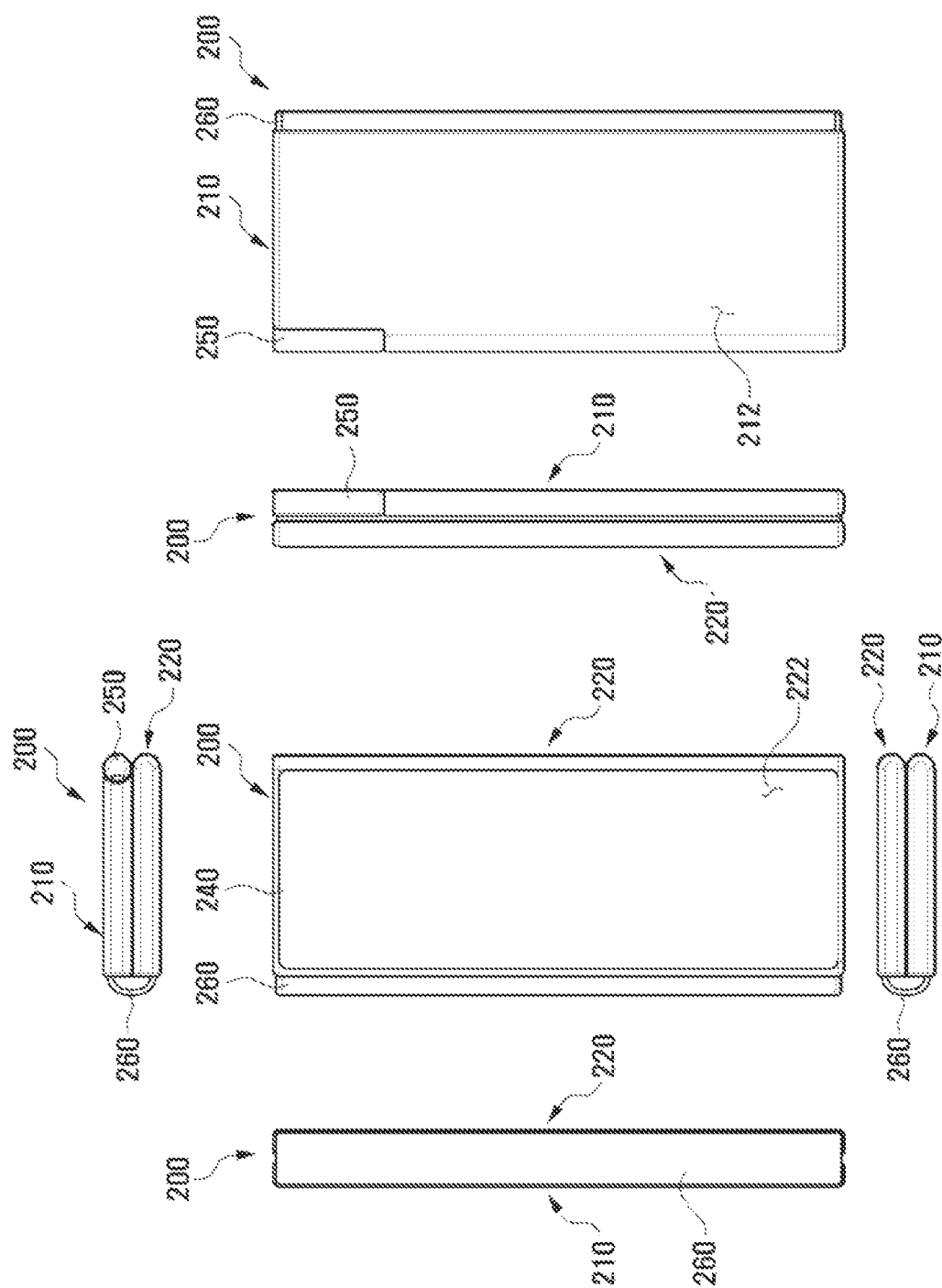

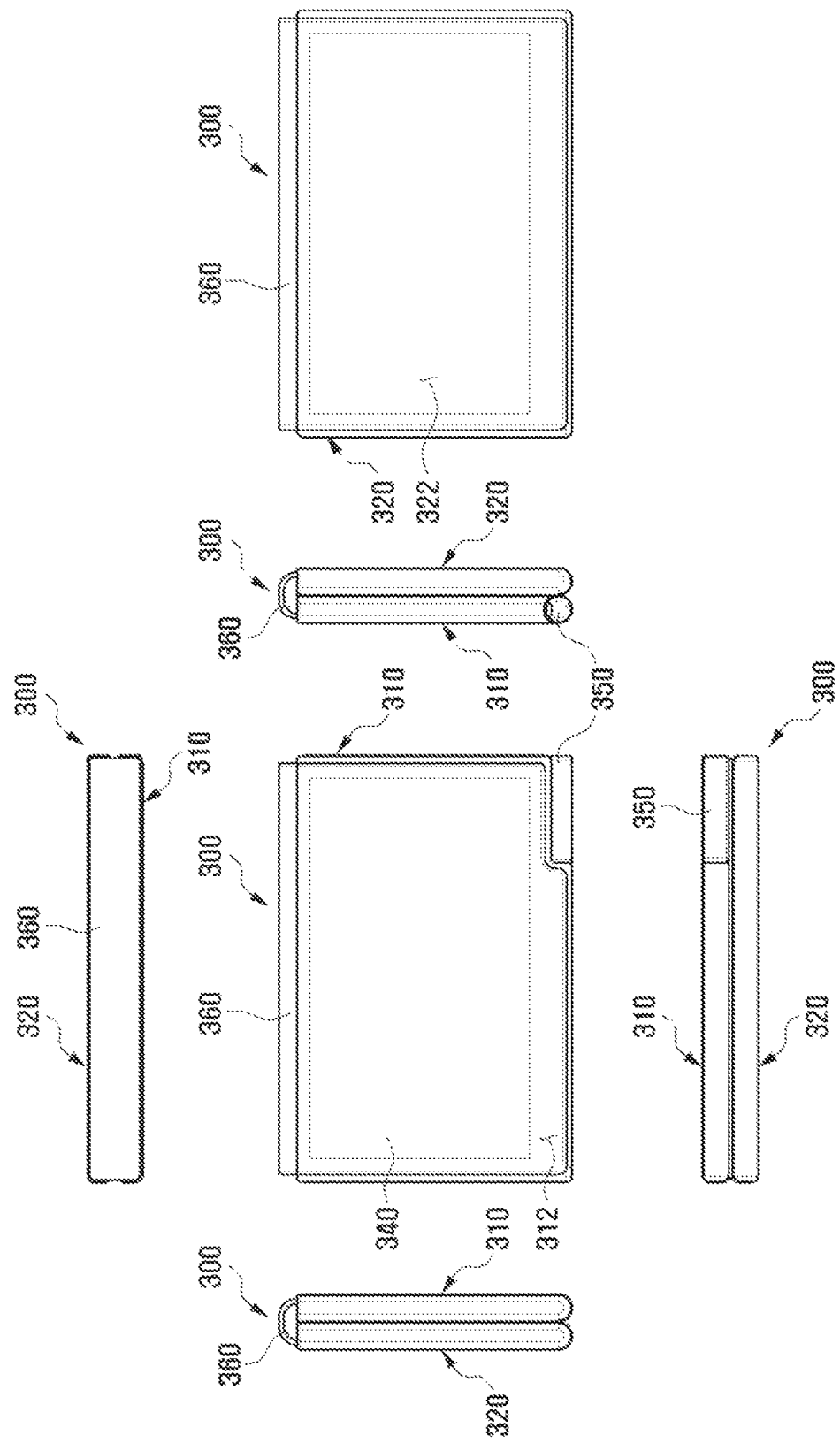

FOLDABLE ELECTRONIC DEVICE HAVING ROTATABLE CAMERA AND METHOD FOR CAPTURING IMAGES THEREBY

CROSS-REFERENCE TO RELATED APPLICATION(S)

This application is a continuation application, based on and claiming priority under 35 U.S.C. § 120 to PCT International Application No. PCT/KR2020/017759, which was filed on Dec. 7, 2020, and claims priority to Korean Patent Application No. 10-2019-0162582, filed on Dec. 9, 2019, in the Korean Intellectual Property Office, the disclosures of which are incorporated by reference herein their entirety.

BACKGROUND

Technical Field

Certain embodiments of the disclosure relate to a foldable electronic device, and, more particular, to a foldable electronic device having a rotatable camera.

Description of Related Art

Portable electronic devices (hereinafter, "electronic devices"), such as smartphones, have evolved to the point that they now implement a variety of functions. For example, an electronic device may utilize a touch-enabled display, allowing a user to easily access a variety of functions and apps, and display execution screens of the functions and apps through the display.

As electronic devices have evolved, they have moved away from the traditional "bar" shape towards more diversified shapes. One shape in particular that has recently developed utilizes a flexible or foldable display. Devices that use flexible/foldable displays can improve user convenience, even while providing functions, such as capturing digital images using cameras disposed therein.

SUMMARY

Conventional electronic devices may include a fixed camera lens that is locked in a particular direction such that, to change a field of view of the camera, a user must change the orientation of the electronic device itself.

An electronic device, as disclosed herein, may include a foldable display and two housing structures foldable relative to one another, in which the configuration of the electronic device itself can be varied. Even though the configuration of the device itself can be changed, if the camera lens direction is fixed, the user may still be forced to reorient the electronic device itself to diversity an image capture angle.

In certain embodiments of the disclosure, an electronic device may include a rotatable camera, such that a variety of camera viewpoints may be enabled for capture without moving the electronic device.

In a foldable electronic device as disclosed in the disclosure, an electronic device may include a rotatable camera, and further implement the ability to detect a folding angle and configuration/posture of the device. Thus, the device may predict a user intent to capture an image, and automatically adjust an orientation of the rotatable camera in accordance with the predicted user intent.

A foldable electronic device is disclosed, including a foldable housing including a first housing structure having a first surface and a second surface disposed opposite to the first surface, a second housing structure having a third surface and a fourth surface disposed opposite to the third surface, a hinge structure connecting the first housing and the second housing, such that the first surface of the first housing structure faces the third surface of the second housing structure when the foldable electronic device is disposed in a folded state, a camera including at least one lens, coupled to the first housing structure, and configured to rotate with respect to the first housing structure to change field-of-view (FOV) of the camera, a first display disposed so as to span across the first surface of the first housing structure and the third surface of the second housing structure, a motion sensor configured to detect a posture of the foldable electronic device, a folding angle sensor configured to detect a folding angle between the first housing structure and the second housing structure, at least one processor operatively connected to the first display, the motion sensor, and the folding angle sensor, wherein the processor is configured to: based on detecting an input requesting a function associated with photographic capture by the camera, detect a present posture via the motion sensor and a present folding angle via the folding angle sensor, and drive rotation of the camera, based on the detected present posture and the present folding angle, so as to adjust a present FOV of the camera.

A foldable electronic device and a method for capturing images by using the same, according to certain embodiments of the disclosure, may enable the user to capture images while remaining in a comfortable posture without need to reorient the electronic device, by using a rotatable camera.

BRIEF DESCRIPTION OF THE DRAWINGS

FIG. 2B is a six-view diagram in a folded state of a foldable electronic device provided with a rotatable camera according to certain embodiments.

FIG. 3B is a six-view diagram in a folded state of a foldable electronic device provided with a rotatable camera according to certain embodiments.

DETAILED DESCRIPTION

Figure 1:
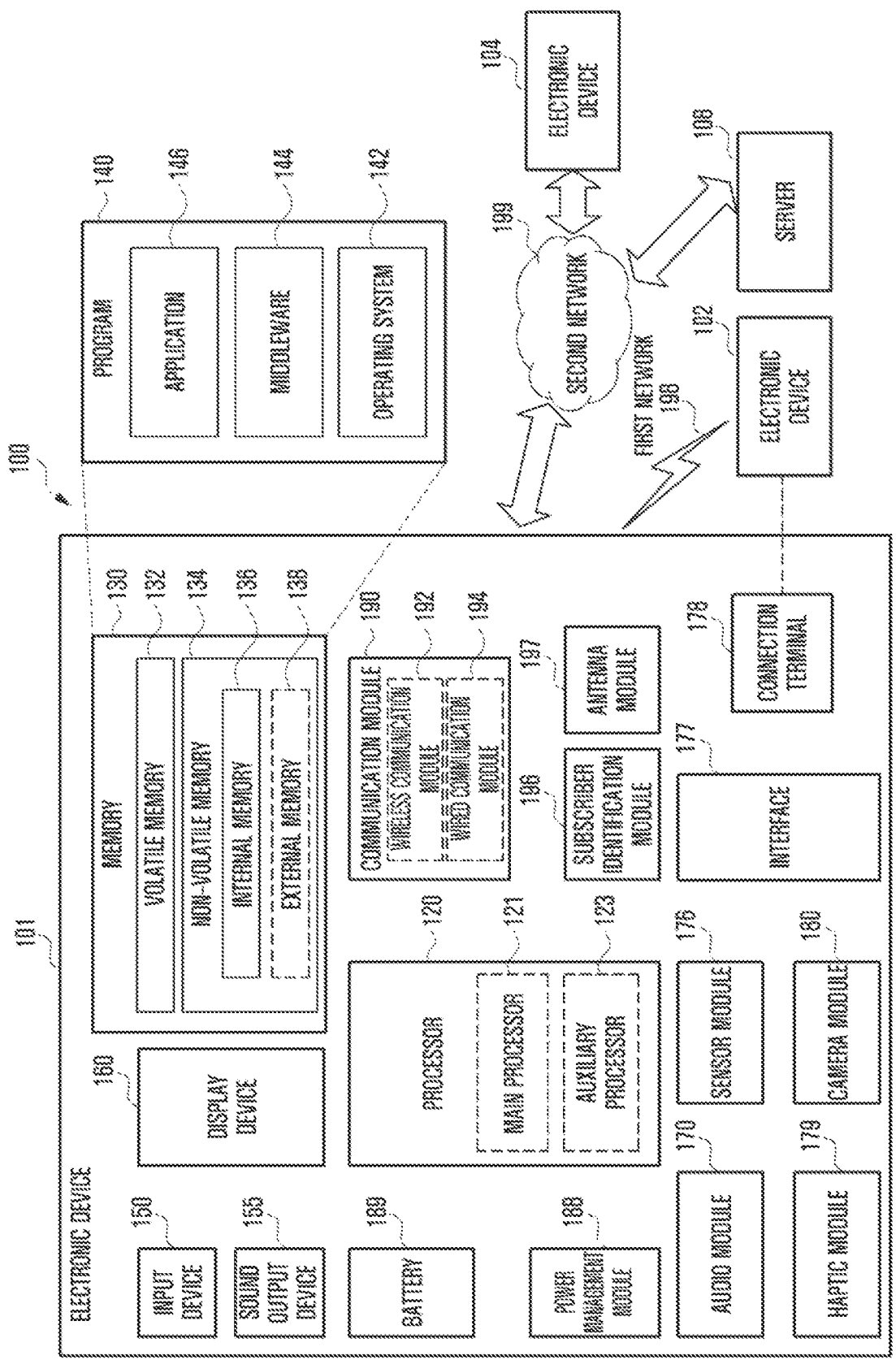
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that certain embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Certain embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each element (e.g., a module or a program) of the above-described elements may include a single entity or multiple entities. According to certain embodiments, one or more of the above-described elements may be omitted, or one or more other elements may be added. Alternatively or additionally, a plurality of elements (e.g., modules or programs) may be integrated into a single element. In such a case, according to certain embodiments, the integrated element may still perform one or more functions of each of the plurality of elements in the same or similar manner as they are performed by a corresponding one of the plurality of elements before the integration. According to certain embodiments, operations performed by the module, the program, or another element may be carried out sequentially, in parallel, repeatedly, or heuristically, or one or more of the operations may be executed in a different order or omitted, or one or more other operations may be added.

Figure 2A:
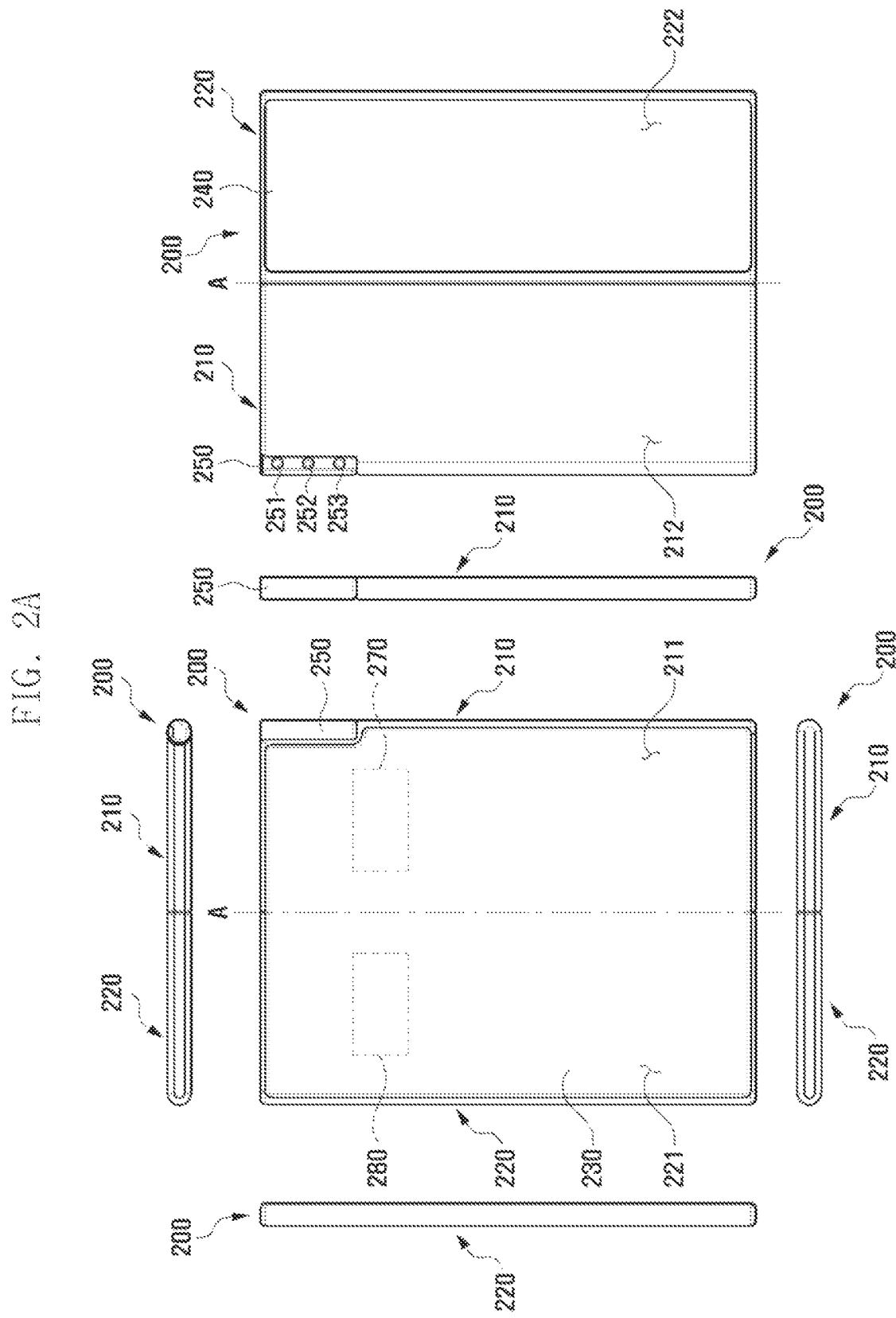
FIG. 2A is a six-view diagram in an unfolded state of a foldable electronic device provided with a rotatable camera according to certain embodiments.

FIG. 2A is a six-view diagram in an unfolded state of a foldable electronic device provided with a rotatable camera 250 according to certain embodiments.

Referring to FIG. 2A, a foldable electronic device 200 (e.g., the electronic device 101 of FIG. 1) according to certain embodiments may include a first housing structure 210 including a rotatable camera 250 (e.g., the camera module 180 of FIG. 1) and second housing structure 220, and may include at least a part of structures and/or functions of the electronic device 101 of FIG. 1. The first housing structure 210 and the second housing structure 220 may mere expressions utilized for distinguishing a housing structure including the rotatable camera 250, and the rotatable camera 250 may be included in any housing structure.

A first surface 211 of the first housing structure 210 and a third surface 221 of the second housing structure 220 may indicate the front surface of the foldable electronic device 200 (e.g., a direction from which a user would observe the display thereof). In addition, a second surface 212 which may be positioned in a direction opposite to the first surface 211 of the first housing structure 210, and a fourth surface 222 which may be positioned in a direction opposite to the third surface 221 of the second housing structure 220, may indicate the rear surface of the foldable electronic device 200.

The first housing structure 210 and the second housing structure 220 may be respectively arranged at both sides with reference to a folding axis (e.g., the A axis), and may have a substantially symmetrical shape with respect to the folding axis. For example, in the front surface of the foldable electronic device 200 on a front view thereof, the first housing structure 210 may be disposed to the right of the foldable electronic device 200 with reference to the folding axis, and second housing structure 220 may be disposed to the left of the foldable electronic device 200 with reference to the folding axis. The first housing structure 210 and the second housing structure 220 may be configured to be folded such that their display surfaces contact, and accordingly, in a folded state or a folding state, the first surface of the first housing structure and the third surface of the second housing structure may be overlapped to face each other.

According to certain embodiments, a hinge structure 260 may be formed between the first housing structure 210 and the second housing structure 220, to allow the front surface of the foldable electronic device 200 to be folded. However, it is understood that this is merely an example in which the foldable electronic device 200 has a structure having housings respectively arranged left and right with reference to the folding axis, and the foldable electronic device may have housings respectively arranged in other ways, such as via above and below the folding axis and may have not only an in-folding type structures, but also out-folding type structures.

An angle formed between the first housing structure 210 and the second housing structure 220, and a distance therebetween may be changed according to whether the foldable electronic device 200 is in an opening state (or an open state), a close state (or a closed state), or an intermediate state. For example, an opening state may indicate an open state or opened state, a flat (or plane) state, an unfolding state or unfolded state. The open state of the foldable electronic device 200 may be a state in which the first housing structure 210 and the second housing structure 220 are arranged side by side, and may indicate a state in which the foldable electronic device 200 is completely unfolded. The open state of the foldable electronic device 200 may be a state in which the first housing structure 210 and the second housing structure 220 form a 180 degree plane, and the first surface 211 of the first housing structure 210 and the third surface 221 of the second housing structure 220 may be disposed to face the same direction (e.g., upwards when the device is disposed on a flat surface, or forwards when held by a user). FIG. 2A is a six-view diagram showing a front view, a rear view, a left side view, a right side view, a plan view, and a bottom view in a state where the foldable electronic device 200 is open.

The closing state of the foldable electronic device 200 may indicate a close state or closed state, or a folding state or folded state (e.g., FIG. 2B). The closed state of the foldable electronic device 200 may be a state in which the first housing structure 210 and the second housing structure 220 are arranged to face each other, and may indicate a state in which the foldable electronic device 200 is completely folded. The closed state of the foldable electronic device 200 may be a state in which the angle between the first housing structure 210 and the second housing structure 220 is a small angle (e.g., 0-5 degrees), and the first surface 211 of the first housing structure 210 and the third surface 221 of the second housing structure 220 face each other. Hereinafter, although it will be described for an electronic device in which a folding type of the foldable electronic device 200 is implemented in an in-folding type, this may be also identically or similarly implemented to an electronic device implemented in an out-folding type.

The intermediate state of the foldable electronic device 200 may be a state in which the first housing structure 210 and the second housing structure 220 are disposed at a predetermined angle between the closed and fully opened angles, and as such, the foldable electronic device 200 may not be considered to be disposed in an open state or a closed state. The intermediate state of the foldable electronic device 200 may indicate a state in which the first surface 211 of the first housing structure 210 and the third surface 221 of the second housing structure 220 form a predetermined angle (e.g., between 6-179 degrees).

A first display 230 (e.g., the display device 160 of FIG. 1) may be formed on the first surface 211 of the first housing structure 210 and the third surface 221 of the second housing structure 220, which together form the front surface of the foldable electronic device 200. The first display 230 may be span the front surface, and may be disposed on at least a part of the front surface across the first surface of the first housing structure and the third surface of the second housing structure. The first display 230 may include a flexible display. The first display 230 may be folded left or right with reference to the folding axis (e.g., the A axis). The first display 230 may include a first display region corresponding to the first surface 211 of the first housing structure 210 and/or a second display region corresponding to the third surface 221 of the second housing structure 220. The first display may include at least a part of structures and/or functions of the display device 160 of FIG. 1.

A second display 240 (e.g., a sub-display or a cover display) (e.g., the display device 160 of FIG. 1) may be formed on at least a part of the rear surface of the foldable electronic device 200. The second display 240 may be formed on at least a part of the fourth surface 222 of the second housing structure 220 of the foldable electronic device 200. Referring to FIG. 2A, although it is illustrated that the second display 240 is disposed over the entirety of the fourth surface 222 of the second housing structure 220, the second display may also be disposed on the second surface 212 of the first housing structure 210, and may be disposed over a part (e.g., less than an entirety) or the entirety of the second surface 212 of the first housing structure 210 and the fourth surface 222 of the second housing structure 220. The second display may include and/or implement at least a portion of the structures and/or functions of the display device 160 of FIG. 1.

The foldable electronic device 200 according to certain embodiments may include the rotatable camera 250, which may be disposed on the first housing structure 210. Referring to FIG. 2A, although it is illustrated that there is a single rotatable camera 250, the multiple rotatable cameras 250 may be formed thereon. In addition, although it is illustrated that the rotatable camera 250 is disposed on the first housing structure 210 of the foldable electronic device 200, the rotatable camera may also be disposed on the first housing structure 210 and/or the second housing structure 220, and if it is a rotatable type, the rotatable camera may be disposed on any portion of the housing structure. The rotatable camera 250 may include at least a part of structures and/or functions of the camera module 180 of FIG. 1.

The rotatable camera 250 of the foldable electronic device 200 may be disposed on the first housing structure 210 and/or the second housing structure 220 of the foldable electronic device 200. Referring to the front view of FIG. 2A, although it is illustrated that the rotatable camera 250 is disposed on a predetermined region of one side corner of the first housing structure 210 with reference to a vertical rotation axis, the rotatable camera may be disposed on any portion of the first housing structure 210 and/or the second housing structure 220 with reference to a horizontal and/or a vertical rotation axis. The form of the rotatable camera may include any form as long as it is a rotatable type.

Referring to FIG. 2A, although it is illustrated that the rotatable camera 250 of the foldable electronic device 200 includes three lenses 251, 252, and 253, additional lenses may be provided thereto, or some lenses may be omitted therefrom. In addition, the three lenses 251, 252, and 253 illustrated therein may be replaced with other configurations. The number (or element), position, configuration, and the like of the lenses included in the rotatable camera illustrated in FIG. 2A may be merely an example, and may not be limited thereto.

According to certain embodiments, the foldable electronic device 200 may include a first motion sensor module 270 (e.g., the sensor module 176 of FIG. 1) in at least a portion of the first housing structure 210.

According to certain embodiments, the foldable electronic device 200 may include a second motion sensor module 280 (e.g., the sensor module 176 of FIG. 1) disposed in at least a portion of the second housing structure 220.

In addition, though not illustrated in FIG. 2A, the foldable electronic device 200 may include a folding angle detection sensor which may be disposed in the hinge structure 260 or the housing structure.

FIG. 2B is a six-view diagram in a folded state of a foldable electronic device 200 provided with a rotatable camera 250 according to certain embodiments.

Referring to FIG. 2B, the foldable electronic device 200 (e.g., the electronic device 101 of FIG. 1) according to certain embodiments may include the hinge structure 260 formed with reference to the folding axis (e.g., the A axis), and may be disposed a folded state (e.g., a closed state), in which the front surface of the foldable electronic device 200 is stowed. FIG. 2B is a six-view diagram showing a front view, a rear view, a left side view, a right side view, a plan view, and a bottom view in a state where the foldable electronic device 200 is closed.

Figure 3A:
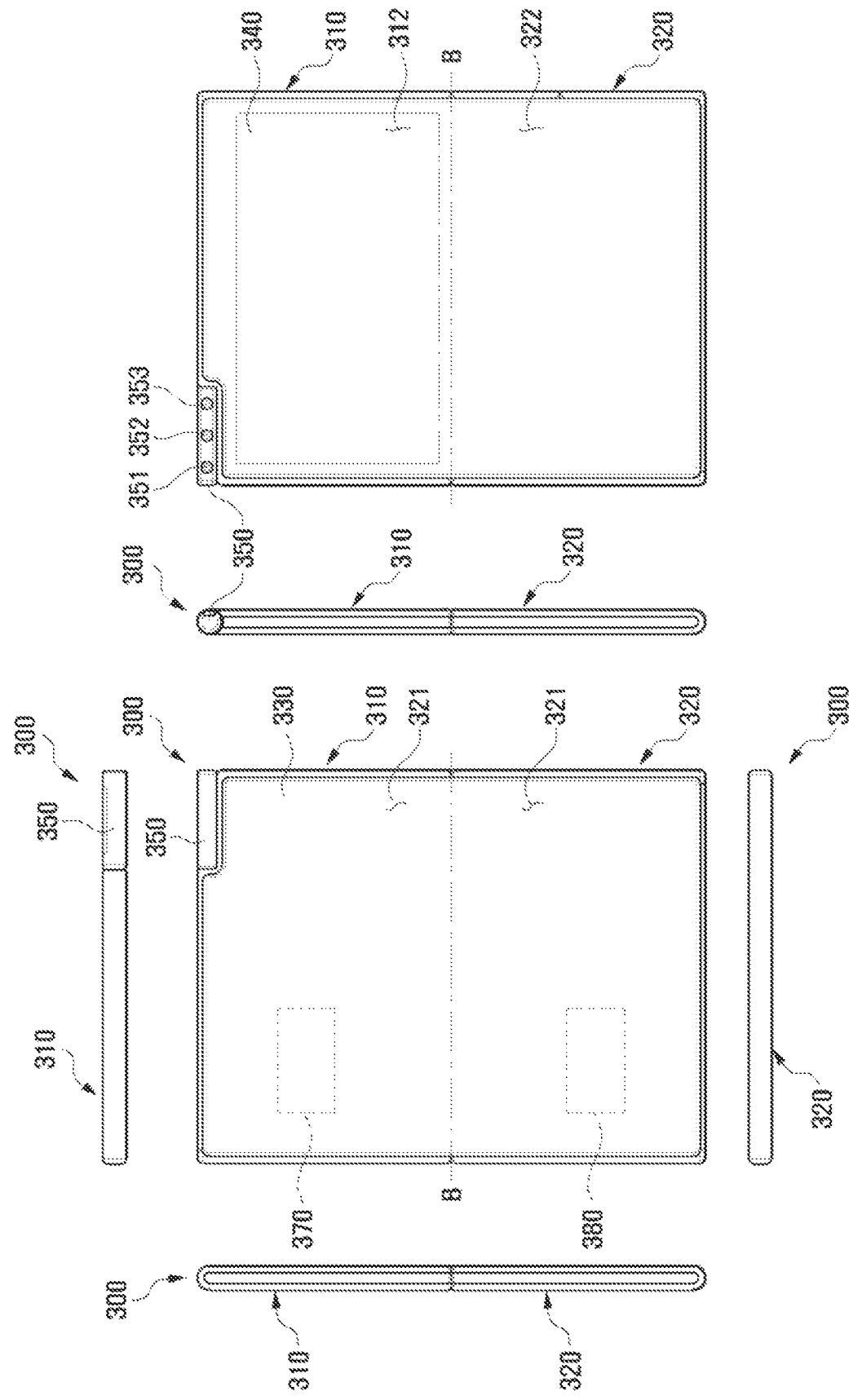
FIG. 3A is a six-view diagram in an unfolded state of a foldable electronic device provided with a rotatable camera according to certain embodiments.

FIG. 3A is a six-view diagram in an unfolded state of a foldable electronic device provided with a rotatable camera 250 according to certain embodiments.

Referring to FIG. 3A, a foldable electronic device 200 (e.g., the electronic device 101 of FIG. 1 or the foldable electronic device 200 of FIG. 2A) according to certain embodiments may include a first housing structure 310 including a rotatable camera 350 (e.g., the camera module 180 of FIG. 1 or the rotatable camera 250 of FIG. 2) and a second housing structure 320, and may include and/or implement at least a part of structures and/or functions of the electronic device 101 of FIG. 1 and/or the foldable electronic device 200 of FIG. 2A. The first housing structure 310 and the second housing structure 320 may be mere expressions for distinguishing a housing structure including the rotatable camera 350, and it is understood that the rotatable camera 350 may be included in any housing structure.

A first surface 311 of the first housing structure 310 and a third surface 321 of the second housing structure 320 may form the front surface of the foldable electronic device 300, and a second surface 312 which may be positioned in a direction opposite to the first surface 311 of the first housing structure 310, and a fourth surface 322 which may be positioned in a direction opposite to the third surface 321 of the second housing structure 320, may form the rear surface of the foldable electronic device 300.

The first housing structure 310 and the second housing structure 320 may be respectively arranged at both sides with reference to a folding axis (e.g., the B axis), and may have a substantially symmetrical shape with respect to the folding axis. For example, in the front surface of the foldable electronic device 300 on a front view thereof, the first housing structure 310 may form the upper side (top) of the foldable electronic device 300 with reference to the folding axis, and second housing structure 320 may form the lower side (bottom) of the foldable electronic device 300 with reference to the folding axis. The first housing structure 310 and the second housing structure 320 may be designed to contact with each other, such that in a folded state or a folding state, the first surface of the first housing structure and the third surface of the second housing structure contact and face one another.

According to certain embodiments, a hinge structure 360 may be formed between the first housing structure 310 and the second housing structure 320, to allow the front surface of the foldable electronic device 300 to be stowed within the housing by folding. However, it is understood that alternative arrangements are possible and that the foldable electronic device 300 may include a structure having housings respectively arranged above and below the folding axis, or arranged left and right with reference to the folding axis, and thus may include not only an in-folding type structure but also an out-folding type structure.

An angle formed between the first housing structure 310 and the second housing structure 320 and a distance therebetween may be changed according to whether the foldable electronic device 300 is an open state (or an opened state), a closed state (or a close state), or an intermediate state. For example, an open state may indicate an open state or opened state, a flat (or plane) state, or an unfolding state or unfolded state. The open state of the foldable electronic device 300 may be a state in which the first housing structure 310 and the second housing structure 320 are arranged side by side so as to form a flat plane, and may indicate a state in which the foldable electronic device 300 is completely unfolded. The open state of the foldable electronic device 300 may be a state in which the first housing structure 310 and the second housing structure 320 form a single plane of 180 degrees, and the first surface 311 of the first housing structure 310 and the third surface 321 of the second housing structure 320 may be arranged so as to face the same direction. FIG. 3A is a six-view diagram showing a front view, a rear view, a left side view, a right side view, a plan view, and a bottom view in a state where the foldable electronic device 300 is open.

The closed state of the foldable electronic device 300 may indicate a close state or closed state, or folding state or folded state (e.g., FIG. 3B). The closed state of the foldable electronic device 300 may be a state in which the first housing structure 310 and the second housing structure 320 are arranged to face each other, and may indicate a state in which the foldable electronic device 300 is completely folded. The closed state of the foldable electronic device 300 may be a state in which the angle between the first housing structure 310 and the second housing structure 320 is a small angle (e.g., 0-5 degrees), and the first surface 311 of the first housing structure 310 and the third surface 321 of the second housing structure 320 may face each other. Hereinafter, although described for an electronic device in which a folding type of the foldable electronic device 300 is implemented in an in-folding type, it is understood that the disclosure also contemplates an electronic device implemented in an out-folding type.

The intermediate state of the foldable electronic device 300 may be a state in which the first housing structure 310 and the second housing structure 320 are arranged with a predetermined angle between the open and closed states, such that the foldable electronic device 300 is not disposed in an open state or a closed state. The intermediate state of the foldable electronic device 300 may indicate a state in which the first surface 311 of the first housing structure 310 and the third surface 321 of the second housing structure 320 form a predetermined angle (e.g., 6-179 degrees).

A first display 330 (e.g., the display device 160 of FIG. 1 or the first display 230 of FIG. 2) may be formed on the first surface 311 of the first housing structure 310 and the third surface 321 of the second housing structure 320, which are the front surface of the foldable electronic device 300. The first display 330 may be entirely formed on the front surface, and may be disposed on at least a part of the front surface spanning both the first surface of the first housing structure and the third surface of the second housing structure. The first display 330 may include a flexible display. The first display 330 may be folded upward or downward with reference to the folding axis (e.g., the B axis). The first display 330 may include a first display region corresponding to the first surface 311 of the first housing structure 310 or a second display region corresponding to the third surface 321 of the second housing structure 320. The first display may include at least a part of structures and/or functions of the display device 160 of FIG. 1 and/or the first display of FIG. 2.

A second display 340 (e.g., a sub-display or a cover display) (e.g., the display device 160 of FIG. 1 or the second display 240 of FIG. 2A) may be formed on at least a part of the rear surface of the foldable electronic device 300. The second display 340 may be formed on at least a part of the fourth surface 322 of the second housing structure 320 of the foldable electronic device 300. Referring to FIG. 3A, although it is illustrated that the second display 340 is disposed over a part of the fourth surface 322 of the second housing structure 320, the second display may in other embodiments be disposed on the second surface 312 of the first housing structure 310, and may be disposed over a part or the entirety of the second surface 312 of the first housing structure 310 and the fourth surface 322 of the second housing structure 320. The second display may include at least a part of structures and/or functions of the display device 160 of FIG. 1 and/or the second display 240 of FIG. 2A.

The foldable electronic device 300 according to certain embodiments may include the rotatable camera 250 disposed on the first housing structure 310. Referring to FIG. 3A, although it is illustrated that the rotatable camera 350 is one, the multiple rotatable cameras 350 may be formed thereon. In addition, although it is illustrated that the rotatable camera 350 is disposed on the first housing structure 310 of the foldable electronic device 300, the rotatable camera may be disposed on the first housing structure 310 and/or the second housing structure 320, and if it is a rotatable type, the rotatable camera may be disposed on any portion of the housing structure. The rotatable camera 350 may include at least a part of structures and/or functions of the camera module 180 of FIG. 1 and/or the rotatable camera 250 of FIG. 2A.

The rotatable camera 350 of the foldable electronic device 300 may be provided on the first housing structure 310 and/or the second housing structure 320 of the foldable electronic device 300. Referring to the front view of FIG. 3A, although it is illustrated that the rotatable camera 350 is disposed on a predetermined region of one side corner of the first housing structure 310 with reference to a horizontal rotation axis, the rotatable camera may be disposed on any portion of the first housing structure 310 and/or the second housing structure 320 with reference to a horizontal and/or a vertical rotation axis. The form of the rotatable camera may include all forms as long as it is a rotatable type.

Referring to FIG. 3A, although it is illustrated that the rotatable camera 350 of the foldable electronic device 300 includes three lenses 351, 352, and 353, additional lenses may be provided thereto. In addition, the three lenses 351, 352, and 353 illustrated therein may be omitted therefrom, or replaced with other configurations.

According to certain embodiments, the foldable electronic device 300 may include a first motion sensor module 370 (e.g., the sensor module 176 of FIG. 1 or the first motion sensor module 270 of FIG. 2A) in at least a portion of the first housing structure 310.

According to certain embodiments, the foldable electronic device 300 may include a second motion sensor module 380 (e.g., the sensor module 176 of FIG. 1 or the second motion sensor module 380 of FIG. 2A) in at least a portion of the second housing structure 320.

In addition, though not illustrated in FIG. 3A, the foldable electronic device 300 may include a folding angle detection sensor which may be positioned in the hinge structure 360 or the housing structure.

FIG. 3B is a six-view diagram in a folded state of a foldable electronic device 300 provided with a rotatable camera 350 according to certain embodiments.

Referring to FIG. 3B, the foldable electronic device 300 (e.g., the electronic device 101 of FIG. 1 or the foldable electronic device 200 of FIG. 2A) according to certain embodiments may have the hinge structure 360 formed with reference to the folding axis (e.g., the B axis), and be a folded state (e.g., a closed state) in which the front surface of the foldable electronic device 300 is folded. FIG. 3B is a six-view diagram showing a front view, a rear view, a left side view, a right side view, a plan view, and a bottom view in a state where the foldable electronic device 300 is closed.

Figure 4:
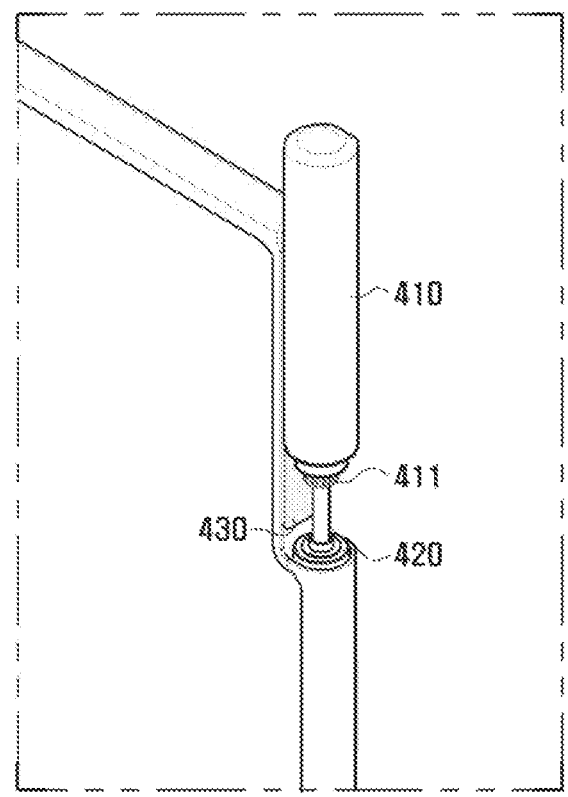
FIG. 4 is a structural view of a rotatable camera provided in a foldable electronic device according to certain embodiments.

FIG. 4 is a structural view of a rotatable camera (e.g., the camera module 180 of FIG. 1, the rotatable camera 250 of FIG. 2A, or the rotatable camera 350 of FIG. 3A) provided in a foldable electronic device (e.g., the electronic device 101 of FIG. 1, the foldable electronic device 200 of FIG. 2A, or the foldable electronic device 300 of FIG. 3A) according to certain embodiments.

Referring to FIG. 4, a rotatable camera provided in the foldable electronic device may include a camera module 410. The camera module 410 itself may include one or more lenses (e.g., the lenses 251, 252, or 253 of FIG. 2A, or the lens 351, 352, or 353 of FIG. 3A), a gear 411 for driving rotation of the camera module, a motor 420 for rotating the camera module, and a cleaner 430 for cleaning of the lens.

Referring to FIG. 2A and FIG. 3A, although it is illustrated that the camera module of the rotatable camera according to certain embodiments includes three lenses, additional lenses may be provided therein. In addition, the three lenses illustrated therein may be omitted therefrom, or may be replaced to other configurations.

Referring to FIG. 4, the cleaner of the camera module, which cleans the lens, may be positioned on a surface (or a curved-surface) which can contact with a housing (e.g., the first housing structure 210 of FIG. 2A or the first housing structure 310 of FIG. 3A) for the rotatable camera of the of foldable electronic device. The cleaner of the camera module may be formed of any suitable soft material that can remove contaminants from the lenses of the rotatable camera.

Figure 5A:
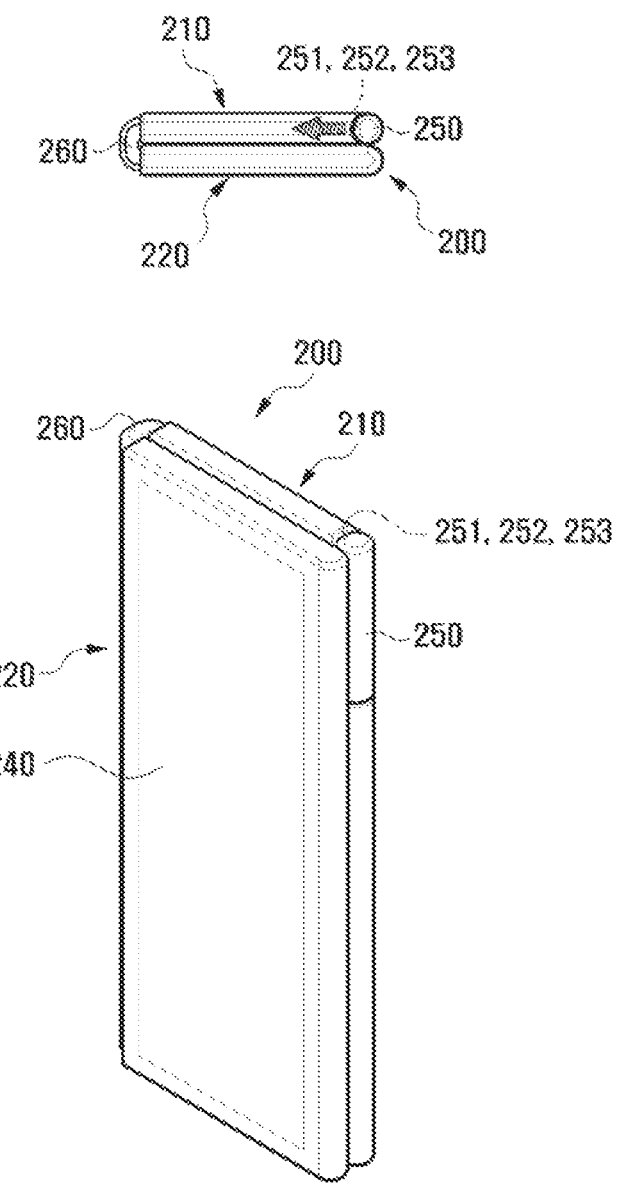
FIG. 5A is an example view showing a direction of a camera in a folded state of a foldable electronic device provided with a rotatable camera according to certain embodiments.

FIG. 5A is an example view illustrating a direction of a camera in a folded state of a foldable electronic device (e.g., the electronic device 101 of FIG. 1, the foldable electronic device 200 of FIG. 2A, or the foldable electronic device 300 of FIG. 3A) provided with a rotatable camera (e.g., the camera module 180 of FIG. 1, the rotatable camera 250 of FIG. 2A, or the rotatable camera 350 of FIG. 3A) according to certain embodiments.

In order to allow the rotatable camera to protect the camera lens at the time of folding thereof, a processor (e.g., processor 120 of FIG. 1) may drive the rotatable camera to face inside (inward or in) with respect to a housing (e.g., the first housing structure 210 of FIG. 2A or the first housing structure 310 of FIG. 3A). Referring to FIG. 5A, when the foldable electronic device is the folded state, the processor may cause the camera to rotate such that the lens of the rotatable camera faces an interior the housing, thereby stowing the camera and protecting it from damage. In addition, camera may be rotated such that the lens of the rotatable camera brushes against the cleaner (e.g., the cleaner 430 of FIG. 4) which may clean the lens of the camera module in the process of it being stowed in the housing.

Figure 5B:
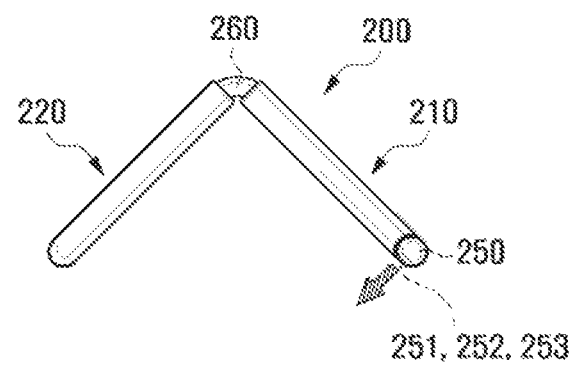
FIG. 5B is an example view showing a direction of a camera in a folded state of a foldable electronic device provided with a rotatable camera according to certain embodiments.
Figure 5B:
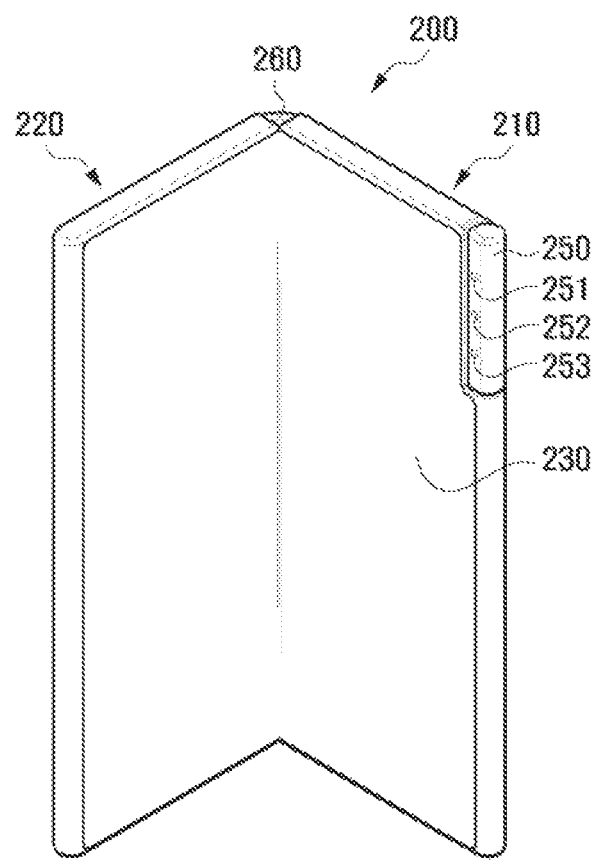

FIG. 5B is an example view showing a direction of a camera in a folded state of a foldable electronic device (e.g., the electronic device 101 of FIG. 1, the foldable electronic device 200 of FIG. 2A, or the foldable electronic device 300 of FIG. 3A) provided with a rotatable camera (e.g., the camera module 180 of FIG. 1, the rotatable camera 250 of FIG. 2A, or the rotatable camera 350 of FIG. 3A) according to certain embodiments.

The processor (e.g., the processor 120 of FIG. 1) of the foldable electronic device may drive the rotatable camera to rotate in a counterclockwise direction when disposed in an intermediate state. FIG. 5A and FIG. 5B, illustrate process in which the foldable electronic device is proceeding through an intermediate state to a folded state. Although it is illustrated that the rotatable camera rotates in a counterclockwise direction, this is merely an optional embodiment thereof, and it is understood that the rotatable camera rotates may be configured and driven also to rotate in a clockwise direction.

Figure 5C:
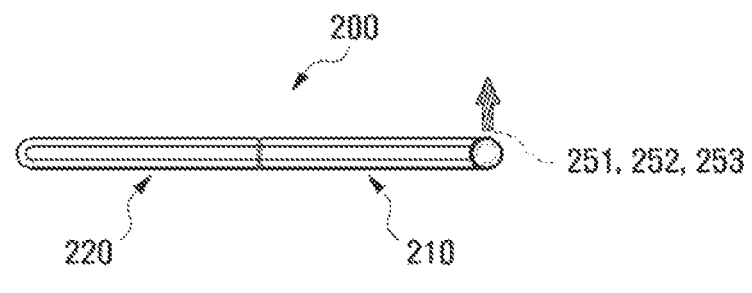
FIG. 5C is an example view showing a direction of a camera in a folded state of a foldable electronic device provided with a rotatable camera according to certain embodiments.
Figure 5C:
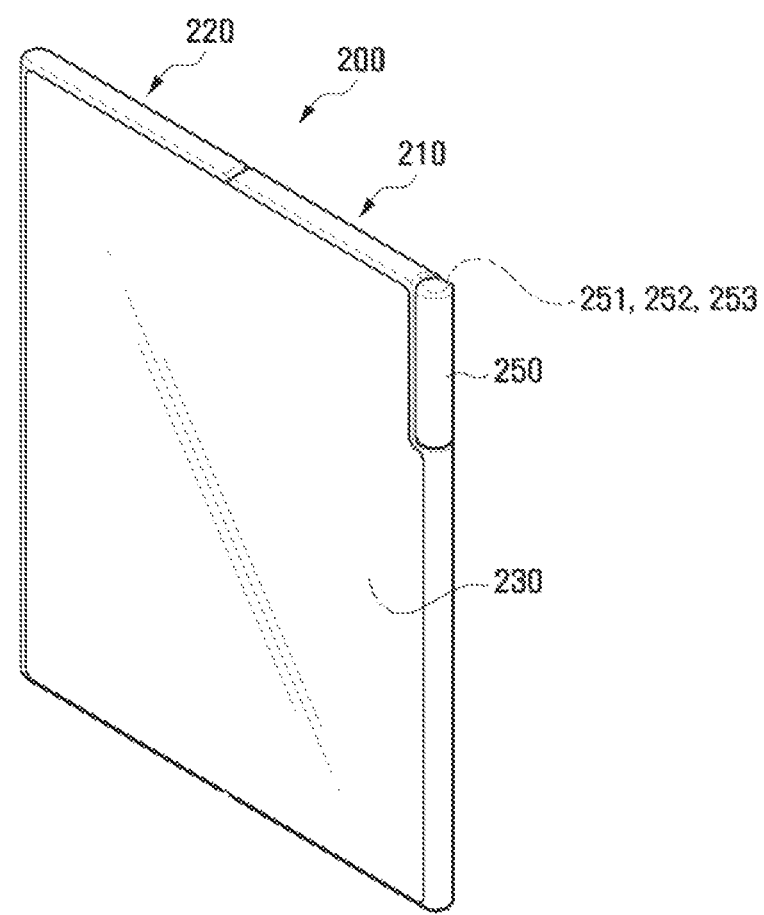

FIG. 5C is an example view showing a direction of a camera in a folded state of a foldable electronic device (e.g., the electronic device 101 of FIG. 1, the foldable electronic device 200 of FIG. 2A, or the foldable electronic device 300 of FIG. 3A) provided with a rotatable camera (e.g., the camera module 180 of FIG. 1, the rotatable camera 250 of FIG. 2A, or the rotatable camera 350 of FIG. 3A) according to certain embodiments.

The processor (e.g., the processor 120 of FIG. 1) of the foldable electronic device may be configured to drive the rotatable camera to rotate in a counterclockwise direction when transitioning into an unfolded state. Referring to FIG. 5B and FIG. 5C, a process is shown in which the foldable electronic device transitions to an unfolded state through an intermediate state. Although it is illustrated herein that the rotatable camera rotates in a counterclockwise direction, it is understood other implementations are considered, and the rotatable camera may also be designed to rotate in the clockwise direction.

Referring to FIG. 5A, FIG. 5B, and FIG. 5C, in a process in which the foldable electronic device transitions from a folded state, through an intermediate state, and into an unfolded state, a change of camera direction (e.g., a direction of the field-of-view of the lens) according to rotation of the camera may be referred to as the counterclockwise direction. The rotation direction of the camera may be also be implemented so as to be clockwise, and in addition, in the process of proceeding from an unfolded state to a folded state, the rotatable camera may move in opposite directions and rotations, etc.

Figure 6A:
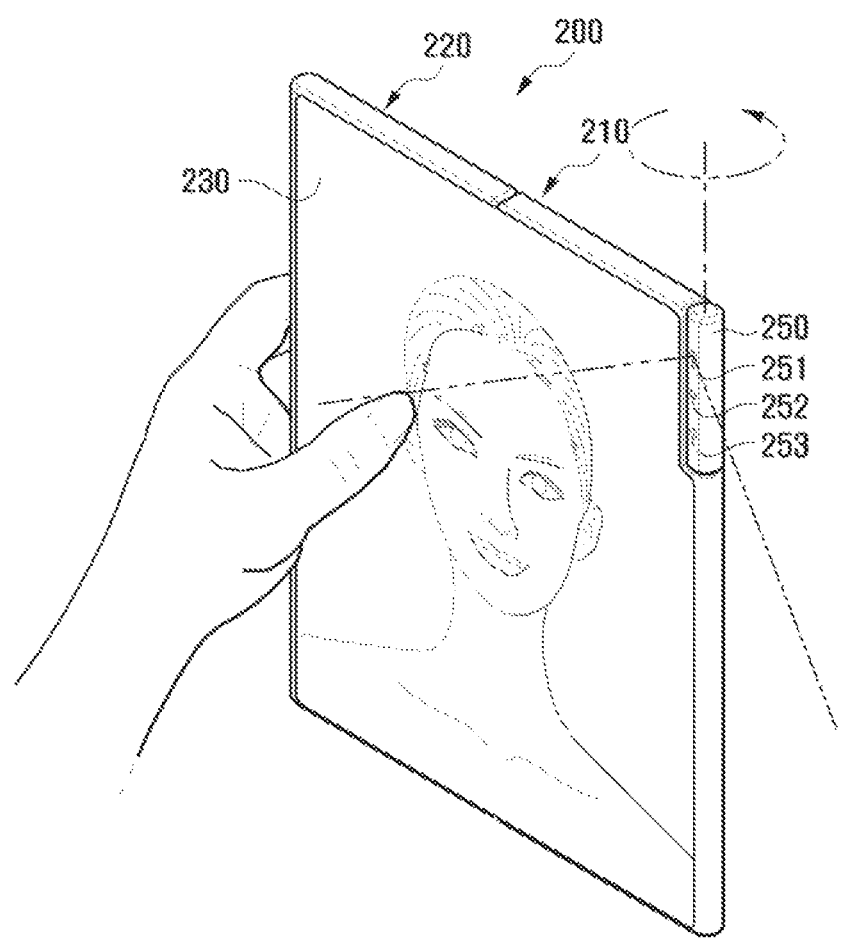
FIG. 6A is an example view showing photographing performed by a foldable electronic device provided with a rotatable camera according to certain embodiments.

FIG. 6A is an example view showing photographing performed by a foldable electronic device (e.g., the electronic device 101 of FIG. 1, the foldable electronic device 200 of FIG. 2A, or the foldable electronic device 300 of FIG. 3A) provided with a rotatable camera (e.g., the camera module 180 of FIG. 1, the rotatable camera 250 of FIG. 2A, or the rotatable camera 350 of FIG. 3A) according to certain embodiments.

When a user of a foldable electronic device having a rotatable camera executes a selfie photographic mode, the processor (e.g., the processor 120 of FIG. 1) may drive rotation of the camera such that the camera lens faces the user's face. The processor may be configured to control the rotation of the rotatable camera in response to various inputs (e.g., left/right drag or up/down drag) to a display (e.g., the display device 160 of FIG. 1, the first display 230 of FIG. 2A, or first display 330 of FIG. 3A) by a user. The angular range of the camera, which is controlled by the processor in response to a user's input, may be a range from 40 degrees to 140 degrees, when the angle of the front surface of the foldable electronic device 200 is between 0 degree to 180 degrees, as per the front view of FIG. 2A. When a drag-based touch input (e.g., a touch input on a display, an input through an external input device, etc.) of a user is detected, the processor may be configured to control the camera to be rotated in proportion to a drag distance of the touch input. The control of the rotation angle of the camera by the processor may be performed according to a separately defined table (e.g., a rotation angle of a camera for each drag distance-photographing mode), and the table may be changed (customized) according to user convenience. The angular range for rotation of the camera described above may be merely an embodiment, and in performing selfie photographing, the rotation thereof may be possible within a range to allow a user's face to be recognized.

Figure 6B:
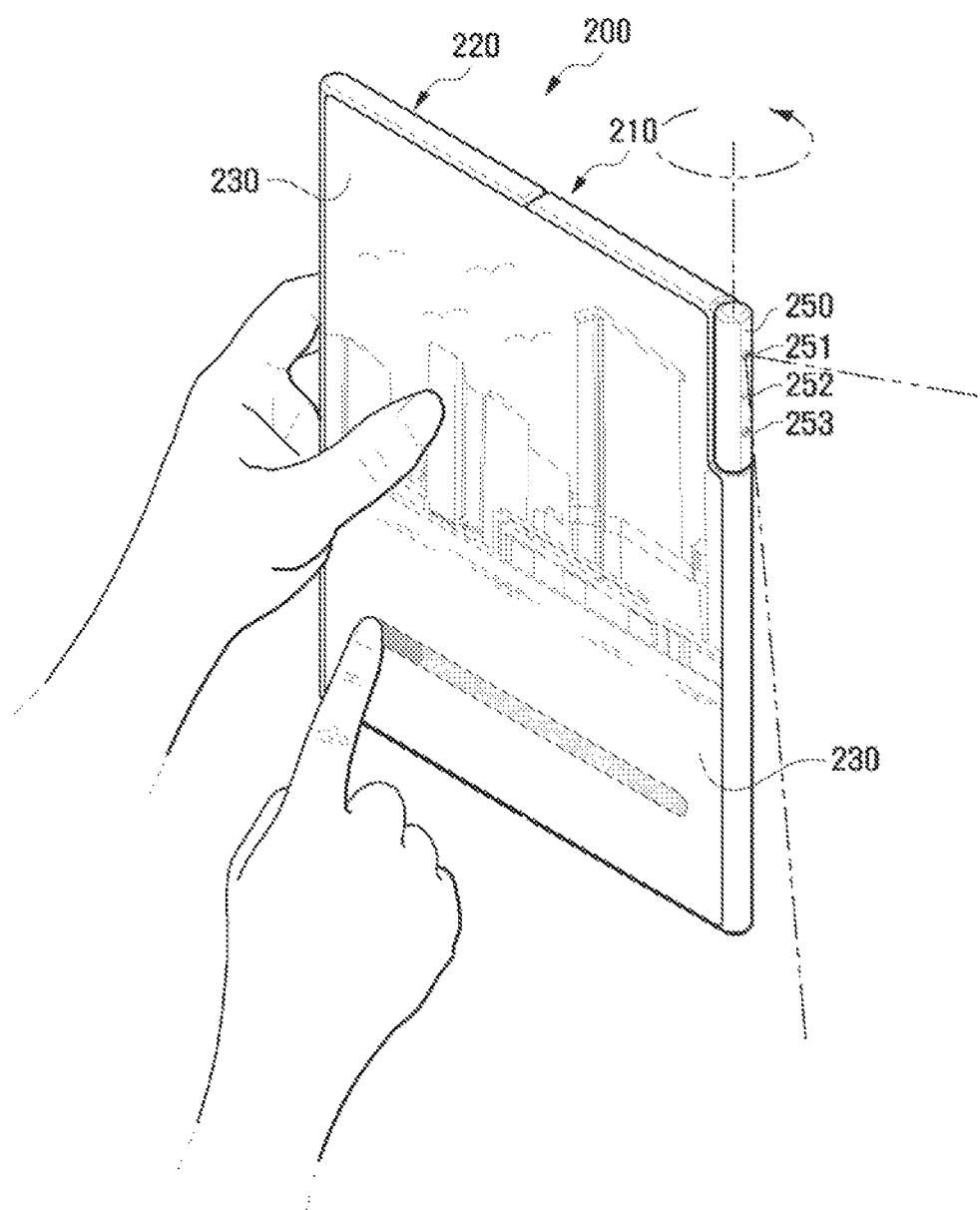
FIG. 6B is an example view showing photographing performed by a foldable electronic device provided with a rotatable camera according to certain embodiments.

FIG. 6B is an example view showing photographing performed by a foldable electronic device (e.g., the electronic device 101 of FIG. 1, the foldable electronic device 200 of FIG. 2A, or the foldable electronic device 300 of FIG. 3A) provided with a rotatable camera (e.g., the camera module 180 of FIG. 1, the rotatable camera 250 of FIG. 2A, or the rotatable camera 350 of FIG. 3A) according to certain embodiments.

Figure 6C:
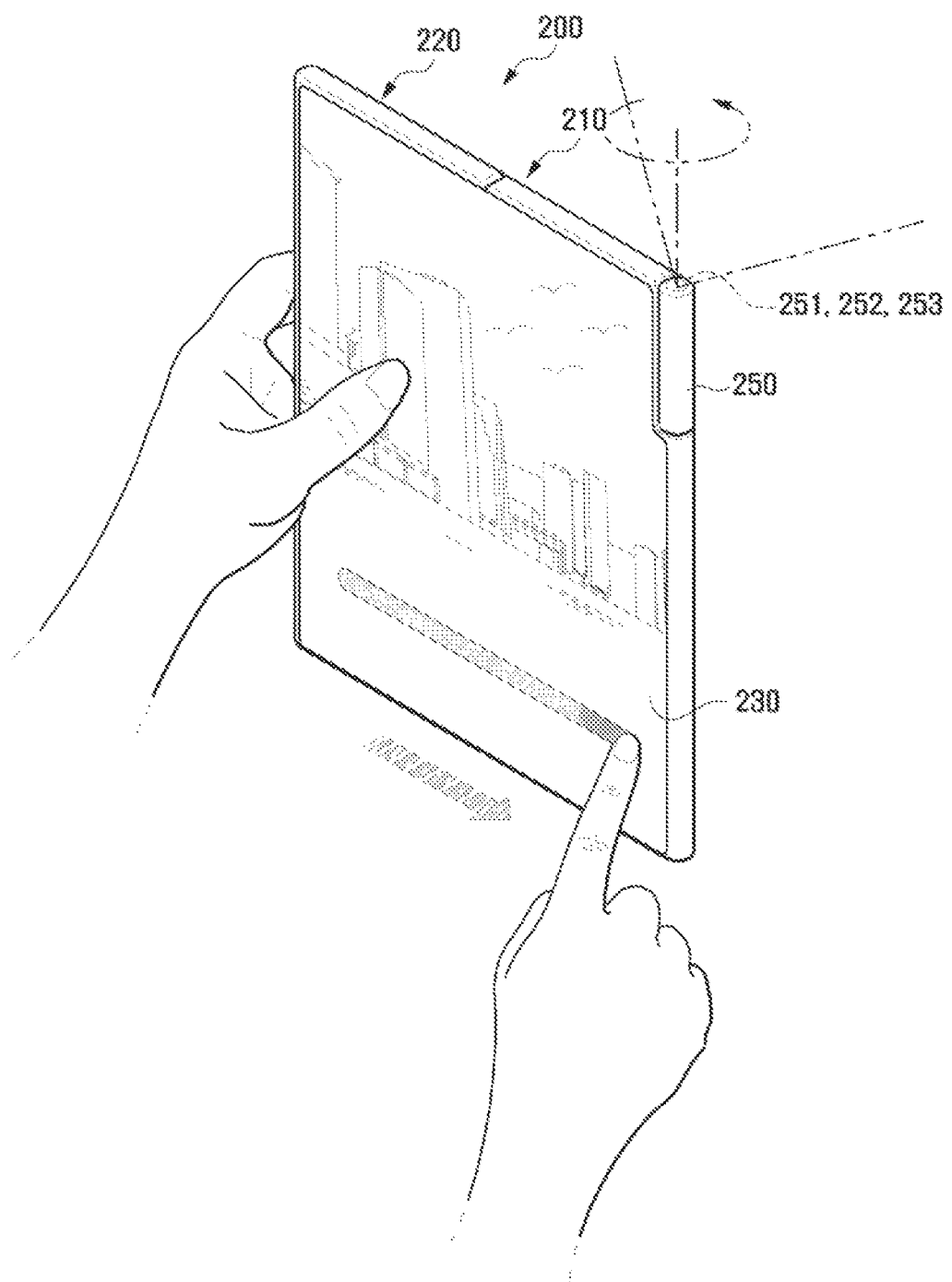
FIG. 6C is an example view showing photographing performed by a foldable electronic device provided with a rotatable camera according to certain embodiments.

FIG. 6C is an example view showing photographing performed by a foldable electronic device (e.g., the electronic device 101 of FIG. 1, the foldable electronic device 200 of FIG. 2A, or the foldable electronic device 300 of FIG. 3A) provided with a rotatable camera (e.g., the camera module 180 of FIG. 1, the rotatable camera 250 of FIG. 2A, or the rotatable camera 350 of FIG. 3A) according to certain embodiments.

When a user of a foldable electronic device provided with a rotatable camera executes a landscape (or panoramic) photographic capture mode, the processor (e.g., the processor 120 of FIG. 1) may be configured to control the rotation thereof such that the camera lens of the rotatable camera faces a landscape. Here, the processor may be configured to control the rotation of the rotatable camera in response to various inputs (e.g., left/right drag or up/down drag) to a display (e.g., the display device 160 of FIG. 1, the first display 230 of FIG. 2A, or first display 330 of FIG. 3A) by a user. For example, the angular range of the camera, which is controlled by the processor in response to a user's input, may be a range excluding the angular range which enables selfie photographing of the FIG. 6A. When a touch input (e.g., a touch input on a display, an input through an external input device, etc.) of a user is sensed and received, the processor may be configured to control such that the camera is rotated in proportion to the drag distance of the touch input. As seen in FIGS. 6B-6C, a graphical element of the UI may be displayed to help guide the drag input. The control of a rotation angle of the camera by the processor may be performed according to a separately defined table (e.g., a rotation angle of a camera for each drag distance-photographing mode), and the table may be changed (customized) according to user convenience. The angular range for rotation of the camera described above may be merely an embodiment, and in performing landscape photographing, the rotation of the camera may be possible within an angular range excluding a range which allows the camera to face toward a user's face. In addition, the control of rotation of the camera, which is performed by the processor in proportion to the drag distance of the touch input, may be applied to all cases when photographing is performed by the camera of the foldable electronic device provided with the rotatable camera described in the disclosure.

Figure 7:
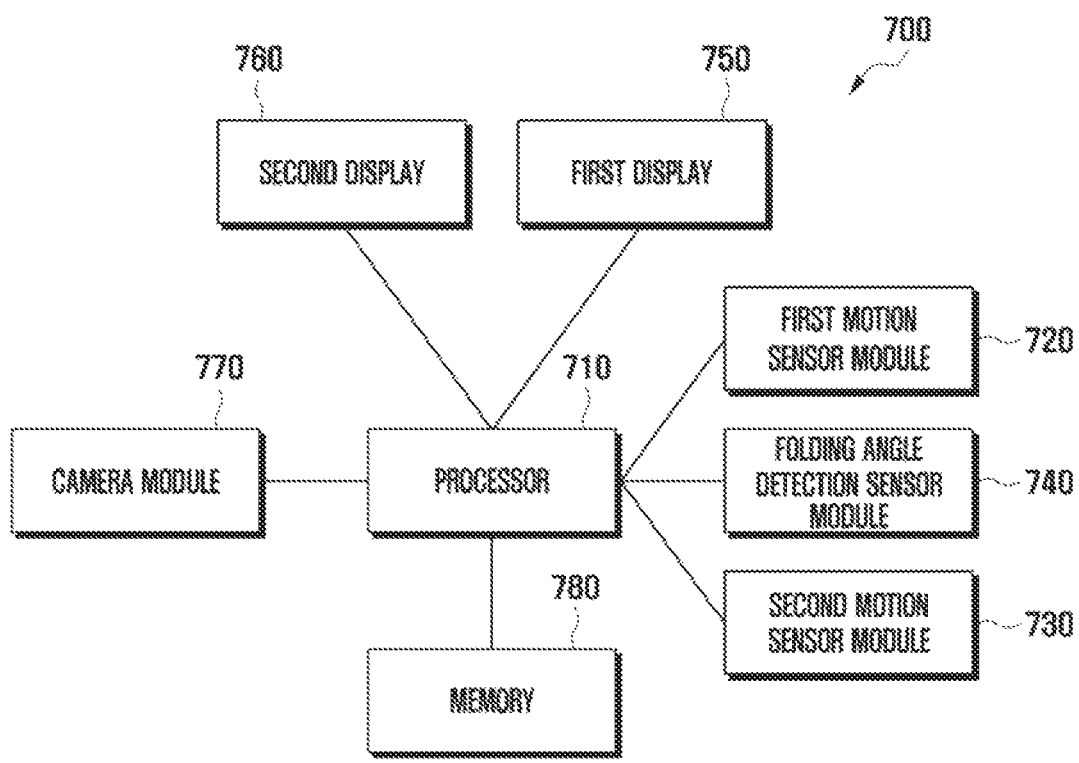
FIG. 7 is a block diagram showing a structure of a foldable electronic device according to certain embodiments.

FIG. 7 is a block diagram 700 showing a structure of a foldable electronic device (e.g., the electronic device 101 of FIG. 1, the foldable electronic device 200 of FIG. 2A, or foldable electronic device 300 of FIG. 3A) according to certain embodiments.

Referring to FIG. 7, the foldable electronic device may include a processor 710 (e.g., the processor 120 of FIG. 1), a first motion sensor module 720 (e.g., the sensor module 176 of FIG. 1, the first motion sensor module 270 of FIG. 2A, or the first motion sensor module 370 of FIG. 3A), a second motion sensor module 730 (e.g., the sensor module 176 of FIG. 1, the second motion sensor module 280 of FIG. 2A, or the second motion sensor module 380 of FIG. 3A), a folding angle sensor module 740 (e.g., the sensor module 176 of FIG. 1), a first display 750 (e.g., the display device 160 of FIG. 1, the first display 230 of FIG. 2A, or the first display 330 of FIG. 3A), a second display 760 (e.g., the display device 160 of FIG. 1, the second display 240 of FIG. 2A, or the second display 340 of FIG. 3A), a camera module 770 (e.g., the camera module 180 of FIG. 1, the rotatable camera 250 of FIG. 2A, or the rotatable camera 350 of FIG. 3A), and a memory 780 (e.g., the memory 130 of FIG. 1), and some of the illustrated elements may be omitted or replaced. The foldable electronic device may include at least a part of configurations and/or functions of the electronic device 101 of FIG. 1, the foldable electronic device 200 of FIG. 2A, and/or the foldable electronic device 300 of FIG. 3A.

According to certain embodiments, the foldable electronic device may include the structure of FIG. 2A, FIG. 3A, and FIG. 4, and may include a foldable structure. In addition, the foldable electronic device, in a folding type, may include an in-folding and/or an out-folding type, and may be folded vertically and/or horizontally with reference to the folding axis.

According to certain embodiments, the processor 710 may be of controlling each of elements of the foldable electronic device and/or performing communication-related calculations and data processing, and may include at least a part of configurations and/or functions of the processor 120 of FIG. 1. The processor may be, functionally, operatively, and/or electrically, connected to internal elements of the foldable electronic device including the first motion sensor module, the second motion sensor module, the folding angle sensor module, the first display, the second display, the camera module, and the memory.

The processor 710 according to certain embodiments may be configured to identify a posture (e.g., a posture of the first housing structure 210 of FIG. 2A) of the housing, which is detected using the first motion sensor module. The processor may be configured to identify a posture (e.g., a posture of the second housing structure 220 of FIG. 2A) of the housing, which is detected using the second motion sensor module. The processor may be configured to identify a parallel state (whether the housing and a floor are parallel) of the housing, which is detected from the first motion sensor module and the second motion sensor module. According to an embodiment, the processor may be configured to identify an upright state (e.g., when the phone is folded as to resemble a character "⌐") or an upward upright state (e.g., when the phone is folded as to resemble a character "L") of the housing, which may be detected using other sensor modules. According to an embodiment, the processor may be configured to identify whether to correspond to entry conditions of predesignated photographing modes (e.g., a forward photographing mode, a downward photographing mode, an upward photographing mode, and the like) stored in the memory, and when corresponding to the entry conditions, to control such that the predesignated photographing mode is executed.

According to certain embodiments, the processor may be configured to identify a folding angle (e.g., a folding angle in which the first housing structure 210 of FIG. 2A and the second housing structure 220 of FIG. 2A form) of the housing, which is detected through the folding angle detection sensor.

The first motion sensor module 720 according to certain embodiments may be configured to detect a posture of the foldable electronic device and/or a posture of housing (e.g., the first housing structure 210 of FIG. 2A, the second housing structure 220 of FIG. 2A, the first housing structure 310 of FIG. 3A, or the second housing structure 320 of FIG. 3A).

The first motion sensor module 720 according to certain embodiments may be disposed on at least a portion (e.g., a portion of the first housing structure 210 of FIG. 2A, or a portion of the first housing structure 310 of FIG. 3A) of the housing structure of the foldable electronic device. The first motion sensor module may include a gyroscopic (or gyro) sensor, an angular velocity sensor, and the like, and elements of the first motion sensor module may be omitted or replaced. The first motion sensor module according to certain embodiments of the disclosure may include at least a part of configurations and/or functions of the sensor module of FIG. 1, the first motion sensor module of FIG. 2A, and/or the first motion sensor module of FIG. 3A.

The second motion sensor module 730 according to certain embodiments may be configured to detect a posture of the foldable electronic device and/or a posture of housing (e.g., the first housing structure 210 of FIG. 2A, the second housing structure 220 of FIG. 2A, the first housing structure 310 of FIG. 3A, or the second housing structure 320 of FIG. 3B).

The second motion sensor module 730 according to certain embodiments may be disposed on at least a portion (e.g., a portion of the second housing structure 220 of FIG. 2A, or a portion of the second housing structure 320 of FIG. 3A) of the housing structure of the foldable electronic device. The second motion sensor module may include a gyro sensor, an angular velocity sensor, and the like, and elements of the second motion sensor module may be omitted or replaced. The second motion sensor module according to certain embodiments of the disclosure may include at least a part of configurations and/or functions of the sensor module of FIG. 1, the second motion sensor module of FIG. 2A, and/or the second motion sensor module of FIG. 3A.

The folding angle sensor module 740 according to certain embodiments may be configured to identify a folding angle (e.g., a folding angle in which the first housing structure 210 of FIG. 2A and the second housing structure 220 of FIG. 2A form) of the foldable electronic device. For example, the folding angle of the foldable electronic device may be an angle in which the first housing and the second housing of the foldable electronic device from. The folding angle sensor module may perform a function of detecting the folding angle of the electronic device, and may include a gyro sensor, a magnetic sensor, an acceleration sensor, and the like. In addition, the folding angle sensor module may be positioned on one surface of the first housing and/or the second housing, or may be positioned in the hinge structure. The folding angle sensor module according to certain embodiments of the disclosure may include at least a part of configurations and/or functions of the sensor module of FIG. 1.

The first display 750 according to certain embodiments may be referred to as a flexible display of the foldable electronic device. According to an embodiment, the first display may be positioned on the front surface (e.g., the first surface 211 of the first housing structure 210 of FIG. 2A and the third surface 221 of the second housing structure 220) of the foldable electronic device. According to an embodiment, the first display may be folded into an arrangement (e.g., in-folding) such that the two displays face one another with reference to the hinge structure. In addition, the first display may be folded into an arrangement (an out-folding) so as to be disposed opposite to each other with reference to the hinge structure. According to an embodiment, the first display may also function as an auxiliary display in certain configurations. The embodiments may be merely an example, and the first display may become a main display or the auxiliary display of the electronic device, may be positioned on the front surface or the rear surface thereof, and may be implemented in a flexible display or a general display. The first display according to certain embodiments of the disclosure may include at least a part of configurations and/or functions of the display device of FIG. 1, the first display of 2A, and/or the first display of FIG. 3A.

The second display 760 according to certain embodiments may be referred to as a general display of the foldable electronic device. According to an embodiment, the second display may be disposed on the rear surface (e.g., the second surface 212 of the first housing structure 210 of FIG. 2A and the fourth surface 222 of the second housing structure 220) of the foldable electronic device. According to an embodiment, the second display may also function as a main display. The embodiments may be merely an example, and the second display may function as a main display or an auxiliary display of the electronic device, may be positioned on the front surface or the rear surface thereof, and may be implemented in a flexible display or a general display. The second display according to certain embodiments of the disclosure may include at least a part of configurations and/or functions of the display device of FIG. 1, the second display of 2A, and/or the second display of FIG. 3A.

According to certain embodiments, each of the first display and the second display may include a touch sensor, and the touch sensor may be implemented in one of various types including an in-cell type and an on-cell type.

The camera module 770 according to certain embodiments may be referred to as a rotatable camera of the foldable electronic device. According to an embodiment, the appearance and the shape of the camera may be implemented using any appearance and shape suitable for permitting rotation of the camera. In addition, the camera module may be disposed on any region of the electronic device suitable for allowing the rotation function. The camera module according to certain embodiments of the disclosure may include at least a part of configurations and/or functions of the camera module 180 of FIG. 1, the rotatable camera 250 of FIG. 2A, and/or the rotatable camera 350 of FIG. 3A.

The memory 780 according to certain embodiments may be, functionally, operatively, and/or electrically, connected to the processor, and may store various instructions which may be executed by the processor. The instructions may include various control commands including arithmetic and logical operations, data movement, and input/output which may be recognized by the processor. The memory according to certain embodiments of the disclosure may include at least a part of configurations and/or functions of the memory of FIG. 1.

Figure 8:
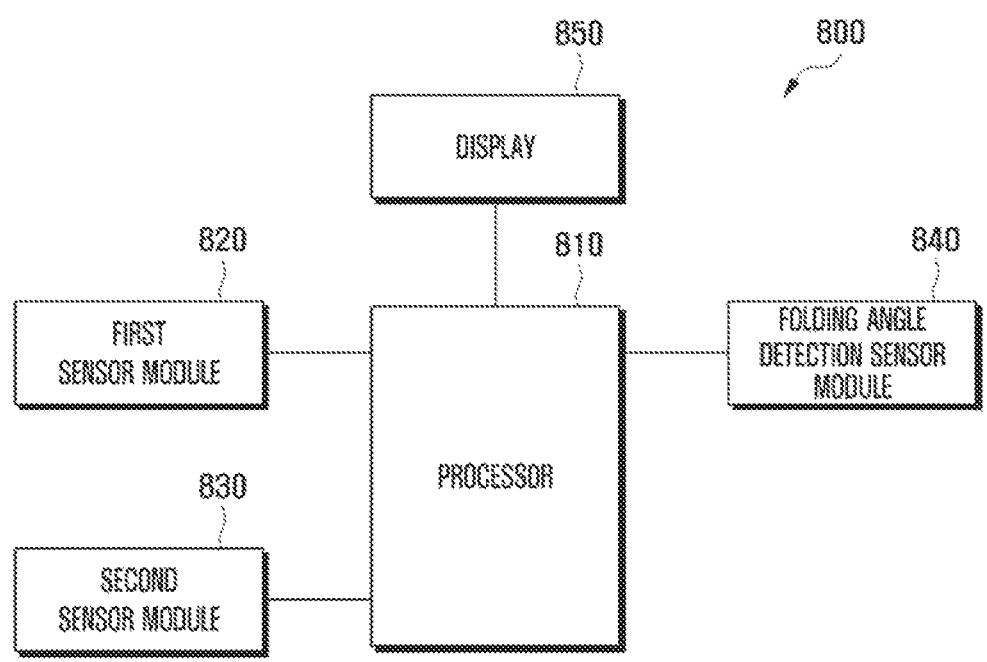
FIG. 8 is a block diagram of a foldable electronic device for detecting a horizontal state and a folding angle of the foldable electronic device according to certain embodiments.

FIG. 8 is a block diagram 800 of a foldable electronic device for detecting a posture (a posture of the housing) and a folding angle of the foldable electronic device (e.g., the electronic device 101 of the FIG. 1, the foldable electronic device 200 of FIG. 2A, the foldable electronic device 300 of FIG. 3A, or the foldable electronic device of FIG. 7) according to certain embodiments.

Referring to FIG. 8, the foldable electronic device may include a processor 810 (e.g., the processor 120 of FIG. 1 or the processor 710 of FIG. 7), a first motion sensor module 820 (e.g., the sensor module 176 of FIG. 1, the first motion sensor module 270 of FIG. 2A, the first motion sensor module 370 of FIG. 3A, or the first motion sensor module 720 of FIG. 7), a second motion sensor module 830 (e.g., the sensor module 176 of FIG. 1, the second motion sensor module 280 of FIG. 2A, the second motion sensor module 380 of FIG. 3A, or the second motion sensor module 830 of FIG. 7), a folding angle sensor module 840 (e.g., the sensor module 176 of FIG. 1 or the folding angle sensor module 730 of FIG. 6), and a display 850 (e.g., the display device 160 of FIG. 1, the first display 230 of FIG. 2A, the second display 240 of FIG. 2A, the first display 330 of FIG. 3A, the second display 340 of FIG. 3A, the first display 750 of FIG. 7, or the second display 760 of FIG. 7).

According to certain embodiments, the processor may control to identify, when a photographing request input is received, the entry conditions of predesignated photographing modes (e.g., a downward photographing mode, a forward photographing mode, an upward photographing mode, and the like) stored in the memory (e.g., the memory 130 of FIG. 1 or the memory 780 of FIG. 7), and based on the identified posture information and folding angle information detected from the first motion sensor module, the second motion sensor module, and the folding angle sensor module, to execute, when corresponding to the entry conditions of the designated photographing mode, a predesignated photographing mode. According to certain embodiments, the processor may include at least a part of structures and/or functions of the processor of FIG. 1 and/or the processor of FIG. 7.

According to certain embodiments, the processor may be configured to identify, after receiving the photographing request input, the condition for entering the predesignated photographing modes, and to enter, after checking the information detected by the sensor modules and when corresponding to the entry conditions, the corresponding photographing mode.

When entering the predesignated photographing mode along with the execution of a camera application of the electronic device, the reception of the photographing request input, and the identification of the information detected by the sensor modules, the processor may be configured to control the rotation range (angle) of the camera so as to correspond to the photographing intention of the predesignated photographing modes. The processor may be configured to control the rotation range of the rotatable camera corresponding to various user inputs within a range set by a user or set in the predesignated photographing modes.

When receiving a photographing request input from the electronic device, identifying the information detected from the sensor modules, and entering a predesignated photographing mode, the processor may be configured to display, on the display, a sign (e.g., a selection UI) for asking intention of determination about whether to execute the photographing mode. The predesignated photographing modes may be set in consideration of a posture for user convenience in photographing. However, users of the electronic device each may have a desired posture to obtain various shooting orientations, framing, etc. Therefore, when the condition for entering a predesignated photographing mode and the sensing information correspond to each other, the processor may be configured to provide a sign (e.g., a selection sign for the forward photographing mode or the upward photographing mode when the foldable electronic device is the letter "L-" shape) to decide that a user enters a predesignated photographing mode.

The processor may control to enable the setting of the predesignated photographing modes of the electronic device to be changed. The setting change of the predesignated photographing mode may be possible in the setting of a camera application, and the processor may be configured to store the changed setting in memory. In an embodiment, when the user changes the settings by reflecting the change in conditions for executing the predesignated photographing modes, the processor may be configured to store the changed conditions in memory in order for the control to which the newly applied conditions have been reflected.

The first motion sensor module 820 according to certain embodiments may include at least a part of structures and/or functions of the sensor module of FIG. 1 and/or the first motion sensor module of FIG. 7.

The second motion sensor module 830 according to certain embodiments may include at least a part of structures and/or functions of the sensor module of FIG. 1 and/or the second motion sensor module of FIG. 7.

The folding angle sensor module 840 according to certain embodiments may include at least a part of structures and/or functions of the sensor module of FIG. 1 and/or the folding angle sensor module of FIG. 7.

The display 850 according to certain embodiments may include at least a part of structures and/or functions of the display device of FIG. 1, the first display of FIG. 2A, the second display of FIG. 2A, the first display of FIG. 3A, the second display of FIG. 3A, the first display of FIG. 7, and/or the second display of FIG. 7.

Figure 9:
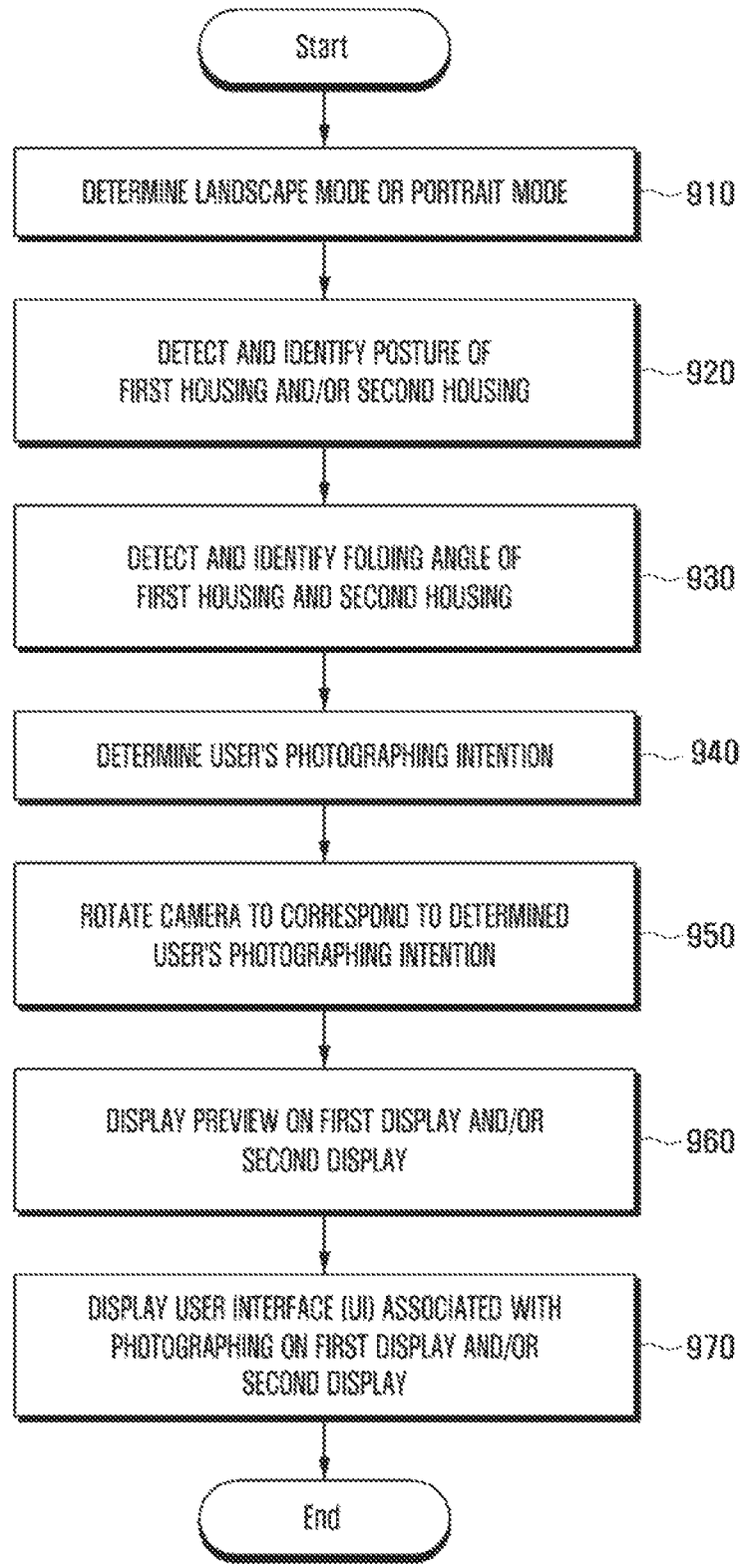
FIG. 9 is a flowchart showing upward photographing performed by a foldable electronic device provided with a rotatable camera according to certain embodiments.

FIG. 9 is a flowchart showing photographing performed by a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments. In the embodiment below, each operation may be performed sequentially, but may not be necessarily performed sequentially. For example, the order of each operation may be changed, and at least two operations may be performed in parallel.

Referring to FIG. 9, in operation 910, when a camera application is executed, the processor of the foldable electronic device may determine whether the electronic device is executing a landscape mode or a portrait mode. This may be determined through, for example, the gyroscopic sensor of the electronic device. Generally, if the electronic device is in a vertically upright state, it may be referred to as the portrait mode, and if the electronic device is in a horizontally laid state, it may be referred to as the landscape mode. The determination may be performed by identifying a sensed value via the gyroscopic sensor indicating an orientation of the device relative to the ground. However, that may not be limited to the example, and may be changed according to a setting of the electronic device.

Referring to FIG. 9, in operation 910, when the electronic device is detected as operating in the landscape mode, the processor may detect a posture (i.e., a physical configuration of the housing) of the electronic device, which may detected through various sensor modules (e.g., the sensor module 176 of FIG. 1, the first motion sensor module 270 of FIG. 2A, the second motion sensor module 280 of FIG. 2A, the first motion sensor module 720 of FIG. 7, the second motion sensor module 730 of FIG. 7, the first motion sensor module 820 of FIG. 8, or the second motion sensor module 830 of FIG. 8), and then select a corresponding predesignated photographing mode for executing photographic capture.

According to certain embodiments, in operation 910, when a photographing request input is received, the processor may proceed with a process of identifying information (a condition for entering a predesignated photographing mode) stored in the memory. For example, the information stored in the memory may include information on a posture and a folding angle of the electronic device for each photographing mode to enter an individual photographing mode that corresponds to a user's photographing intention.

According to certain embodiments, in operation 920, the processor of the electronic device may identify posture (whether each housing structure and the bottom surface thereof are in a parallel state) detection information of the first housing structure and/or the second housing structure from the first motion sensor module and/or the second motion sensor module. According to an embodiment, the processor may identify information, which is sensed through the first motion sensor module, on whether the first housing (e.g., the first housing structure 210 of FIG. 2A or the first housing structure 310 of FIG. 3A) is parallel to the floor, and may identify information, which is sensed through the second motion sensor module, on whether the second housing (e.g., the second housing structure 220 of FIG. 2A or the second housing structure 320 of FIG. 3A) is parallel to the floor.

According to certain embodiments, in operation 920, the processor may detect whether the first housing or the second housing is in an upward upright state (i.e., a physical configuration that resembles the shape of the character " L " shape) or in an upside-downward upright state (a physical configuration that resembles the shape of the character " ⌐ ").

According to certain embodiments, in operation 930, the processor may detect a folding angle of the first housing and the second housing (the electronic device) through the folding angle sensor module (e.g., the sensor module 176 of FIG. 1, the folding angle sensor module 740 of the FIG. 7, or the folding angle sensor module 840 of the FIG. 8). In operation 930, the processor may identify whether the folding angle is disposed within the range of 40 degrees to 120 degrees, and may identify whether the folding angle is 90 degrees among specific folding angles. According to certain embodiments, the range of the folding angle in the conditions for entering the predesignated photographing modes may be different according to the entry condition for each of the designated photographing modes, and may be changed by a user's setting.

According to certain embodiments, in operation 940, the processor of the electronic device may determine a photographing mode for executing photographic capture, as based on an estimated user intent derived from the information detected in operations 920 and 930. Based on the information identified in operations 920 and 930, the processor may determine, for example, that a user intends to capture images in one of a downward, forward, or upward-oriented camera lens FOV, relative to a user's FOV.

According to certain embodiments, in operation 940, based on the information identified after identifying information sensed from the sensor modules, the processor may proceed with a process of determining whether to correspond to the condition for entering a predesignated photographing mode. According to an embodiment, through operation 940, the processor may identify whether the information sensed from the sensor modules corresponds to the condition for entering one of the predesignated photographing modes, and then may determine a photographing intention for whether the identified information corresponds to which one among downward, forward, and upward photographing.

However, it may be merely a part of certain embodiments that the predesignated photographing modes are described as downward, forward, and upward photographing, and that may not be limited thereto.

In addition, when the foldable electronic device is performing photographing in the character " L " shape, the processor may display a UI which allows a user to select, among multiple predesignated photographing modes, a photographing mode that the user want to perform. The reason may be that it is difficult to know which shape a user prefers out of the character " L " shape or the character " ⌐ " shape in forward photographing.

In another embodiment, in the setting the upward photographing mode and the forward photographing mode among the predesignated photographing modes, when the foldable electronic device has the character " L " shape in which the first housing structure is stood upward, the folding angle detection information for upward photographing may be set to 90 degrees, and the folding angle detection information for forward photographing may be set from 40 degrees to 120 degrees. In this case, since 90 degrees becomes an overlapping region, the processor may control such that the UI for enabling user's selection is displayed thereon.

According to certain embodiments, in operation 950, the processor of the electronic device may rotate the camera such that the lens of the rotatable camera corresponds to the direction indicated by the user's estimated photographic intention. For example, according to an embodiment, the processor may rotate the rotatable camera to face downward (e.g., towards the ground) when the user's intent is estimated to indicate a downward photographic capture mode, which may be one of the predesignated photographing modes. Alternatively, when a forward photographing mode is determined, the processor may rotate the camera until the lens of the camera faces forward (e.g., parallel to the ground, capturing an FOV seen from a rear upright surface of the electronic device). Similarly, when the upward photographing mode is determined, the processor may rotate the camera such that the camera lens faces upward (e.g., up towards the sky).

According to certain embodiments, in operation 960, the processor of the electronic device may cause the display to display preview images (previewing images) for photographic capture on the first display (e.g., the display device 160 of FIG. 1, the first display 230 of FIG. 2A, the first display 330 of FIG. 3A, the first display 750 of FIG. 7, and the first display 850 of FIG. 8) region (the first display region) of the first surface of the first housing structure, and/or the first display (e.g., the display device 160 of FIG. 1, the first display 230 of FIG. 2A, the first display 330 of FIG. 3A, the first display 750 of FIG. 7, and the first display 850 of FIG. 8) region (the second display region) of the third surface of the second housing structure.

According to an embodiment, in the downward photographing mode, since the rotatable camera is positioned in the first housing, the processor may display preview images on the first display region of the third surface of the second housing structure in consideration of user convenience in a photographing posture. According to another embodiment, in the forward photographing mode, since the rotatable camera is positioned in the first housing, the processor may display preview images on the first display region of the first surface of the first housing structure in consideration of user convenience in a photographing posture. According to another embodiment, in the upward photographing mode, since the rotatable camera is positioned in the first housing, the processor may display preview images on the first display region of the third surface of the second housing structure in consideration of user convenience in a photographing posture. However, the embodiment may change in the process of setting predesignated photographing modes.

According to certain embodiments, in operation 970, the processor of the electronic device may control to display a user interface associated with photographing on a part and/or the entirety of the first display and/or the second display.

In operation 970, when it is a downward photographing mode, the processor may cause a user interface associated with photographing to be displayed on the first display (e.g., the display device 160 of FIG. 1, the first display 230 of FIG. 2A, the first display 330 of FIG. 3A, the first display 750 of FIG. 7, or the first display 850 of FIG. 8) region (the first display region) of the first surface of the first housing structure. The processor may control to display a UI for photographing on the first display region of the first surface of the first housing structure while displaying preview images for downward photographing on the first display region of the third surface of the second housing structure.

In operation 970, when it is a forward photographing mode, the processor may cause a user interface associated with photographing to be displayed on the first display region of the first surface of the first housing structure. The processor may control to display a UI for photographing on the first display region of the first surface of the first housing structure while displaying preview images for forward photographing on the first display region of the first surface of the first housing structure.

In operation 970, when it is an upward photographing mode, the processor may cause a user interface associated with photographing to be displayed on the first display region of the third surface of the second housing structure. According to an embodiment, the processor may control to display a UI for photographing along with while displaying preview images for upward photographing on the first display region of the third surface of the second housing structure. The processor may control to display the UI of operation 1360 in consideration of a user's field of view and convenience according to the grip of the electronic device.

The processor may control to display the UI of operation 970 in consideration of a user's field of view and convenience according to the grip of the electronic device. However, the embodiment may change in the process of the setting predesignated photographing modes.

According to another embodiment, the processor (e.g., the processor 120 of FIG. 1, the processor 710 of FIG. 7, or the processor 810 of FIG. 8), by the execution of a camera application, may be configured to receive an input for switching between the selfie photographing and the landscape photographing displayed on the display device, and thus to preform photographing for taking landscapes. The input for switching the selfie photographing and the landscape photographing may be displayed on a photographing UI of a camera application (e.g., a using switch button of the front camera and the rear camera). The input for selfie photographing and landscape photographing may be executed in both the landscape mode and the portrait mode.

Figure 10:
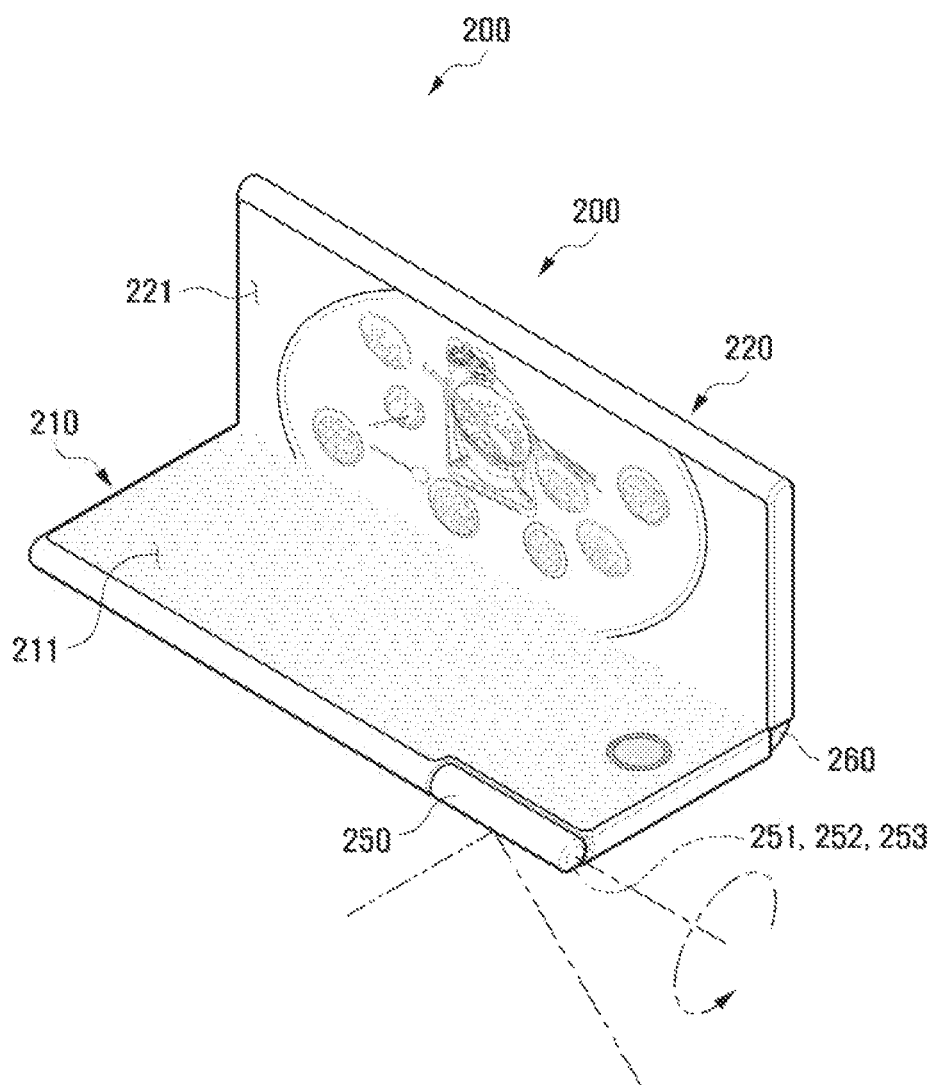
FIG. 10 is an example view showing downward photographing performed by a foldable electronic device provided with a rotatable camera according to certain embodiments.

FIG. 10 is an example view showing downward photographing performed by a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments.

Referring to FIG. 9 and FIG. 10, when entering the downward photographing mode among the predesignated photographing modes, the processor of the foldable electronic device having the rotatable camera may be configured to rotate the lens of the rotatable camera to face downward (e.g., toward the ground). Referring to FIG. 6A, FIG. 6B, and FIG. 6C, in response to various inputs (e.g., inputs to a display on which a UI associated with photographing is displayed) to the first display (e.g., the display device 160 of FIG. 1, the first display 230 of FIG. 2A, the first display 330 of FIG. 3A, the first display 750 of FIG. 7, or the display 850 of FIG. 8) of the first housing (e.g., the first housing structure 210 of FIG. 2A or the first housing structure 310 of FIG. 3A) by a user, the processor (e.g., the processor 120 of FIG. 1, the processor 710 of FIG. 7, or the processor 810 of FIG. 8) may be drive rotation of the camera. The processor may be configured to rotate the camera to correspond to detected user intent to execute the downwards-oriented photographic capture, and the rotation angle of the camera may be adjusted within a range which causes the lens of the camera to face downward.

Figure 11A:
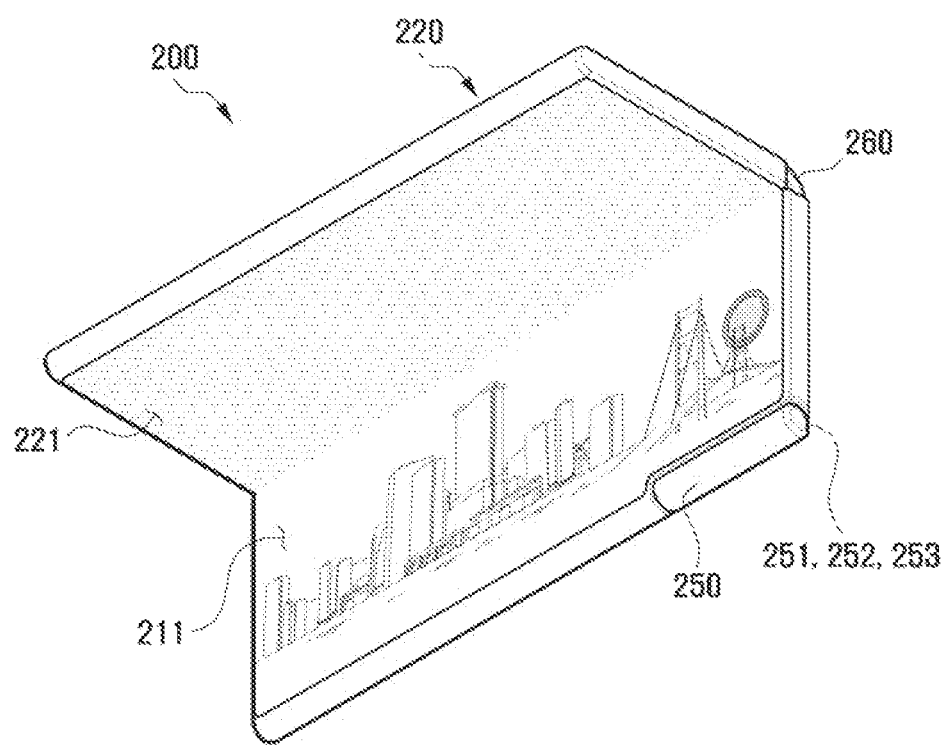
FIG. 11A is an example view showing forward photographing performed by a foldable electronic device provided with a rotatable camera according to certain embodiments.

FIG. 11A is an example view showing forward photographing performed by a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments.

Figure 11B:
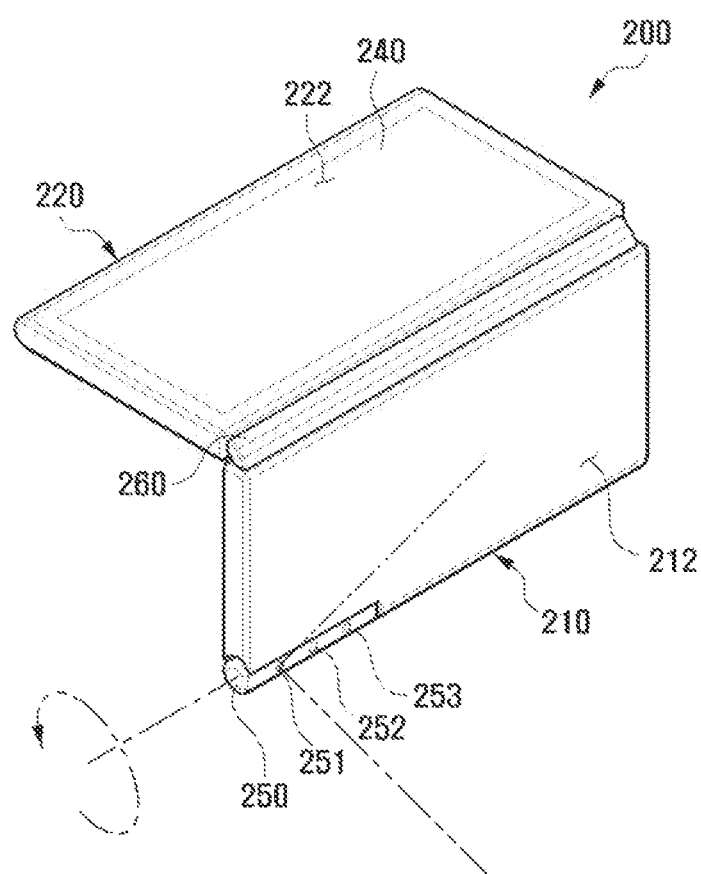
FIG. 11B is an example view showing forward photographing performed by a foldable electronic device provided with a rotatable camera according to certain embodiments.

FIG. 11B is an example view showing forward photographing performed by a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments.

Referring to FIG. 9, FIG. 11A, and FIG. 11B, when entering the forward photographing mode from among the predesignated photographing modes, the processor of a foldable electronic device provided with a rotatable camera may be configured to rotate the lens of the rotatable camera to face forward (e.g., to face a direction opposite to a direction from which the displayed UI is being observed by a user). Referring to FIG. 6A, FIG. 6B, and FIG. 6C, in response to various inputs (various inputs to a display on which a UI associated with photographing is displayed) to the first display of the first housing by a user, the processor may be configured to rotate the camera. The processor may be configured to rotate the camera so as to correspond to the intention of the forward photographing, and the rotation angle of the camera may be adjusted within a range which allows the lens of the camera to face forward. Furthermore, the top half of the display may help provide cover from incident light, so that the displayed UI may be more clearly seen by a user.

Figure 12A:
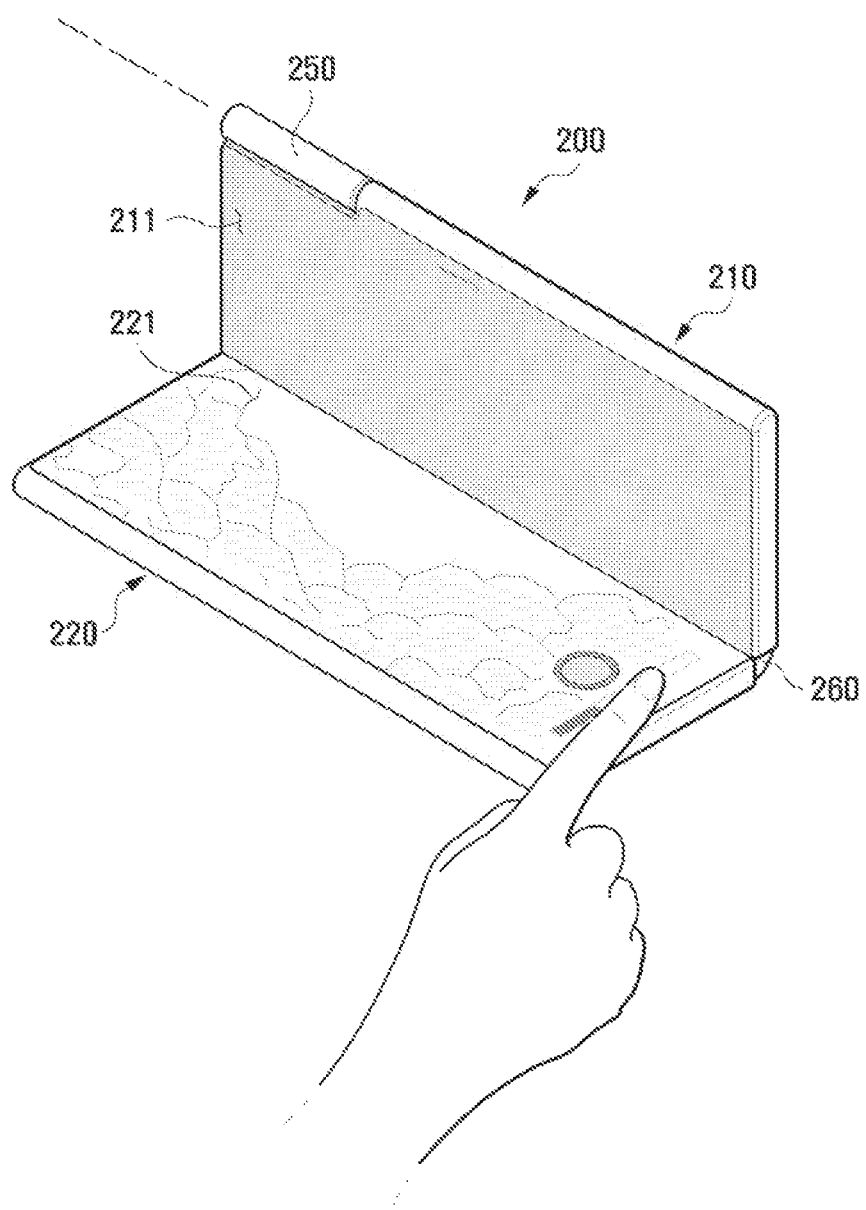
FIG. 12A is an example view showing downward photographing performed by a foldable electronic device provided with a rotatable camera according to certain embodiments.

FIG. 12A is an example view showing upward photographing performed by a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments.

Figure 12B:
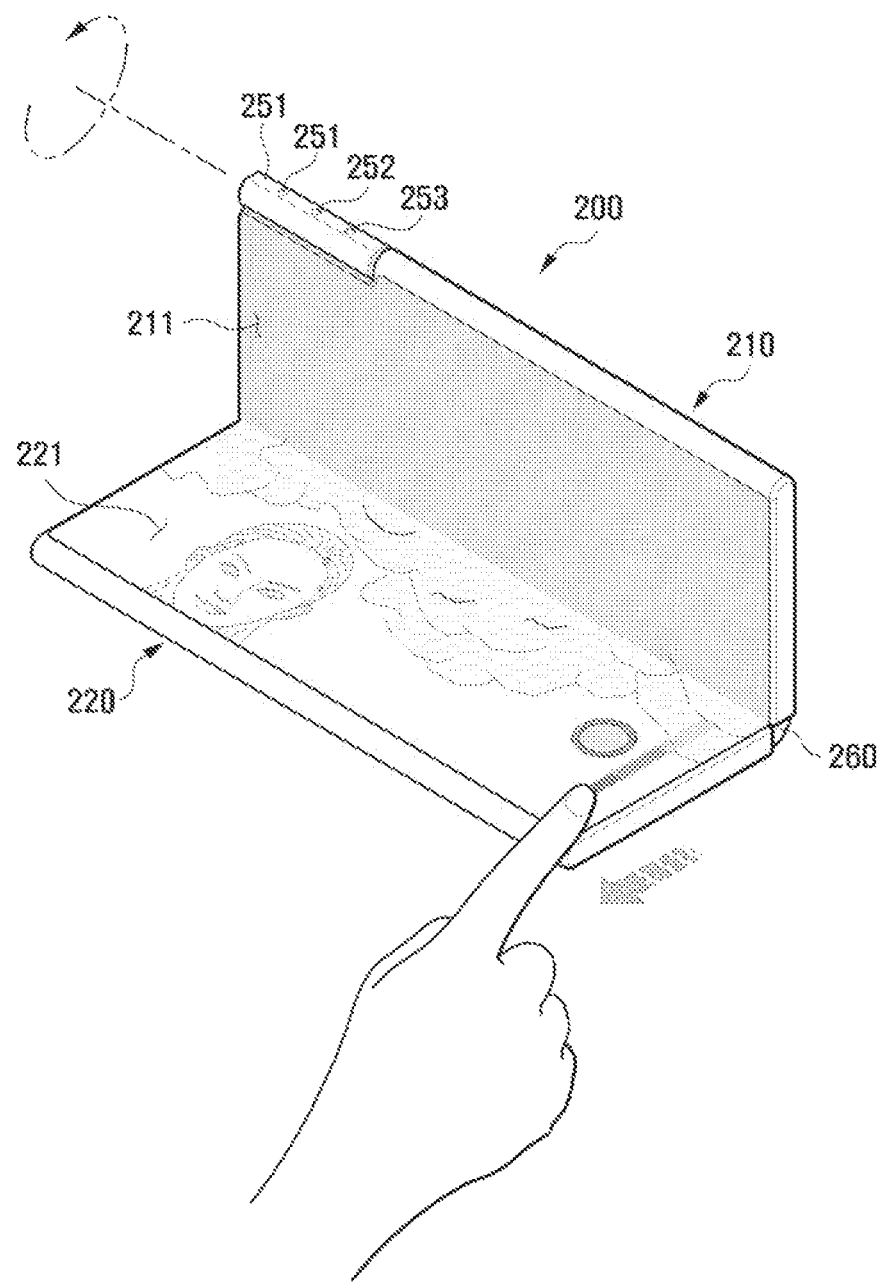
FIG. 12B is an example view showing downward photographing performed by a foldable electronic device provided with a rotatable camera according to certain embodiments.

FIG. 12B is an example view showing upward photographing performed by a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments.

Referring to FIG. 9, FIG. 12A, and FIG. 12B, when entering the upward photographing mode among the predesignated photographing modes, the foldable electronic device provided with a rotatable camera may be configured to rotate the rotatable camera to face upward (e.g., towards the sky). Referring to FIG. 6A, FIG. 6B, and FIG. 6C, in response to various inputs (various inputs to a display on which a UI associated with photographing is displayed) to the first display (e.g., the display device 160 of FIG. 1, the first display 230 of FIG. 2A, the first display 330 of FIG. 3A, the first display 750 of FIG. 7, or the display 850 of FIG. 8) region of the third surface of the second housing structure (e.g., the second housing structure 220 of FIG. 2A) by a user, the processor (e.g., the processor 120 of FIG. 1, the processor 710 of FIG. 7, or the processor 810 of FIG. 8) may be configured to rotate the camera. The processor may be configured to rotate the camera so as to correspond to the intention of the upward photographing, and the rotation angle of the camera may be adjusted within a range which allows the lens of the camera to face upward.

Figure 13A:
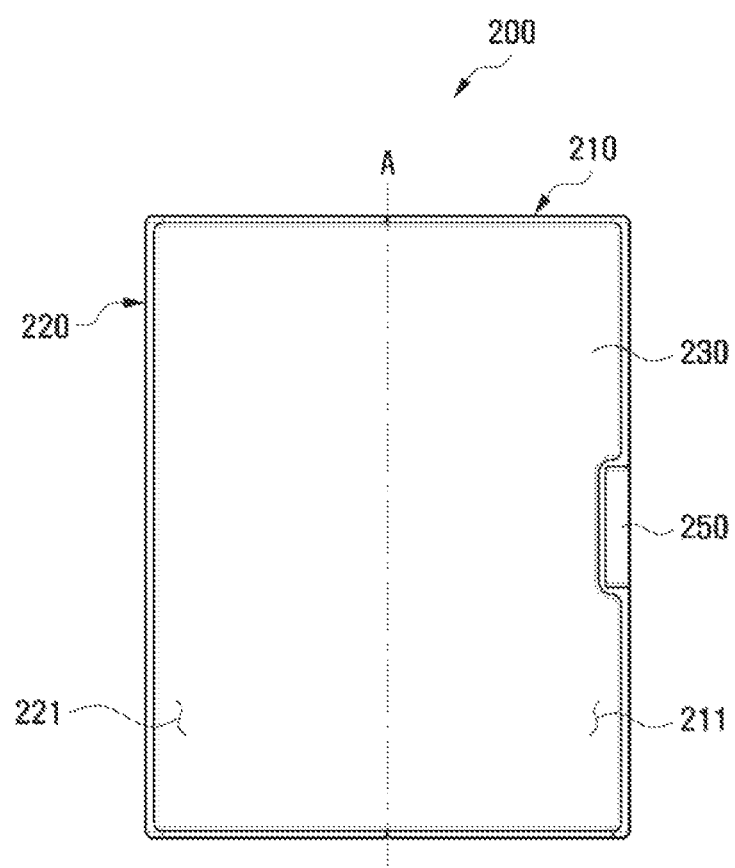
FIG. 13A is a front view in an unfolded state of a foldable electronic device provided with a rotatable camera according to certain embodiments.

FIG. 13A is a front view in a unfolded state of a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments.

Figure 13B:
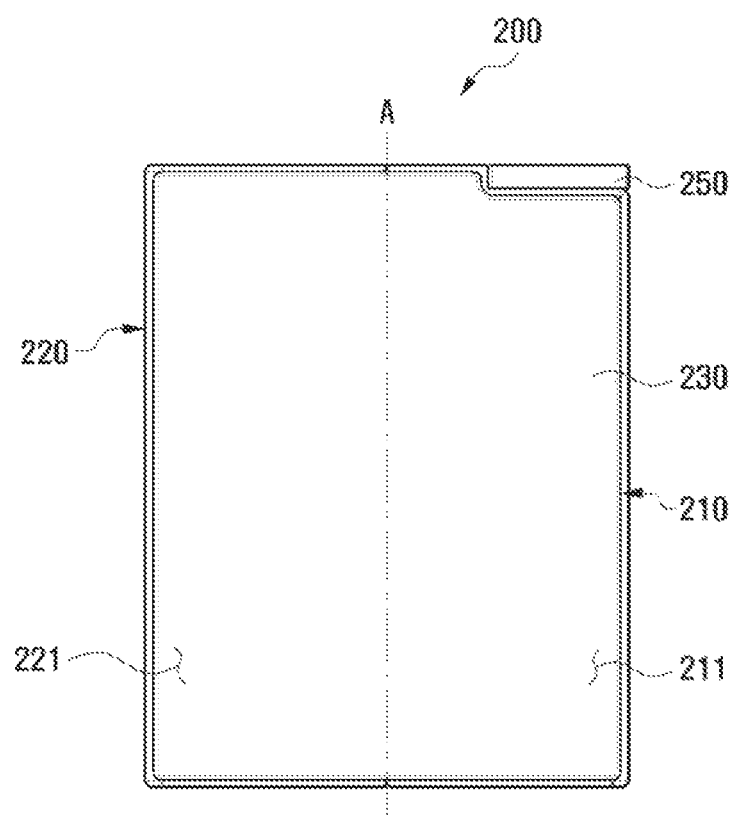
FIG. 13B is a front view in an unfolded state of a foldable electronic device provided with a rotatable camera according to certain embodiments.

FIG. 13B is a front view in an unfolded state of a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments.

Referring to FIG. 13A and FIG. 13B, the foldable electronic device may be configured to be folded left and right with reference to the folding axis (e.g., the A axis), a rotation shaft of the rotatable camera may be installed vertically (as in FIG. 13A) and/or horizontally (as in FIG. 13B). In addition, the rotatable camera may be installed in any position which allows the rotatable camera to be rotatable in the housing structure of the foldable electronic device, such as a long edge of the electronic device in FIG. 13A, and a short edge of the electronic device in FIG. 13B. However, it is understood that the shape thereof may not be also limited thereto.

Figure 14A:
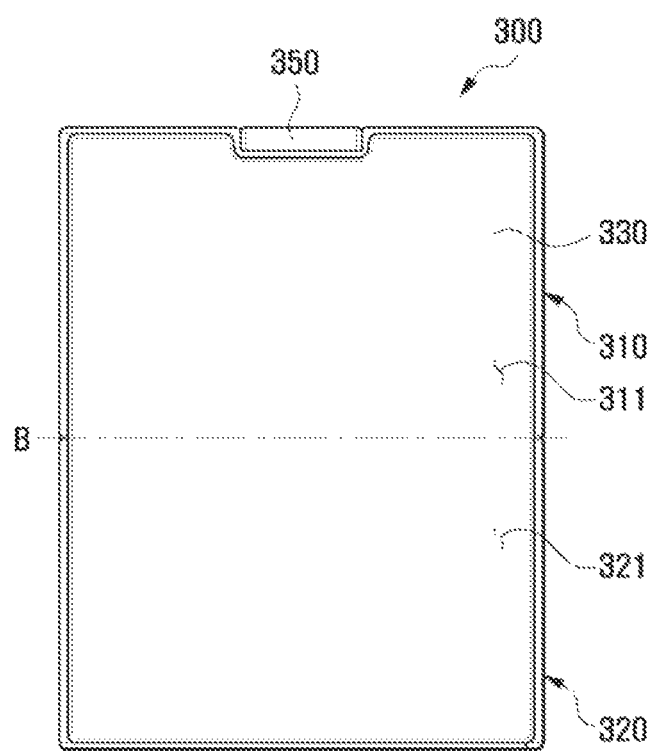
FIG. 14A is a front view in an unfolded state of a foldable electronic device provided with a rotatable camera according to certain embodiments.

FIG. 14A is a front view in an unfolded state of a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments.

Figure 14B:
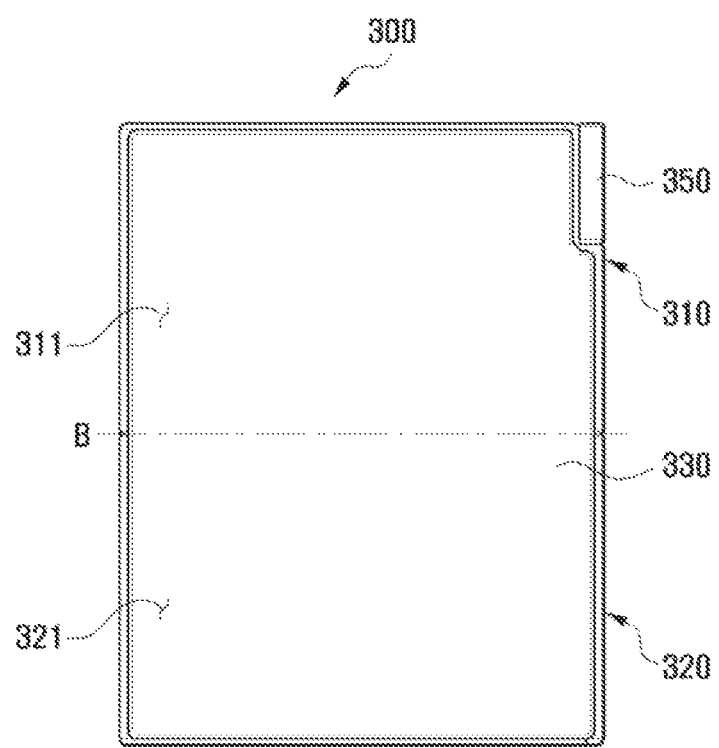
FIG. 14B is a front view in an unfolded state of a foldable electronic device provided with a rotatable camera according to certain embodiments.

FIG. 14B is a front view in an unfolded state of a foldable electronic device (e.g., the electronic device 101 of FIG. 1, the foldable electronic device 200 of FIG. 2A, the foldable electronic device 300 of FIG. 3A, the foldable electronic device of FIG. 7, or the foldable electronic device of FIG. 8) provided with a rotatable camera (e.g., the camera module 180 of FIG. 1, the rotatable camera 250 of FIG. 2A, the rotatable camera 350 of FIG. 3A, or the camera module 770 of FIG. 7) according to certain embodiments.

Referring to FIG. 14A and FIG. 14B, the foldable electronic device may be configured to be folded in an up-down orientation along a horizontal folding axis (e.g., the B axis), but a rotation shaft of the rotatable camera may lakeside be installed vertically and/or horizontally as with previous embodiments. In addition, the rotatable camera may be installed in any position which allows the rotatable camera to be rotatable in the housing structure of the foldable electronic device, and the shape thereof may not be also limited thereto.

What is claimed is:

1. A foldable electronic device, comprising:
   a foldable housing including:
      a first housing structure having a first surface and a second surface disposed opposite to the first surface,
      a second housing structure having a third surface and a fourth surface disposed opposite to the third surface, and
      a hinge structure connecting the first housing and the second housing, such that the first surface of the first housing structure faces the third surface of the second housing structure when the foldable electronic device is disposed in a folded state;
   a camera including at least one lens, coupled to the first housing structure, and configured to rotate with respect to the first housing structure to change field-of-view (FOV) of the camera;
   a first display disposed so as to span across the first surface of the first housing structure and the third surface of the second housing structure;
   a motion sensor configured to detect a posture of the foldable electronic device;
   a folding angle sensor configured to detect a folding angle between the first housing structure and the second housing structure; and
   at least one processor operatively connected to the first display, the motion sensor, and the folding angle sensor, wherein the processor is configured to:
   based on detecting an input requesting a function associated with photographic capture by the camera, detect a present posture via the motion sensor and a present folding angle via the folding angle sensor; and
   drive rotation of the camera, based on the detected present posture and the present folding angle, so as to adjust a present FOV of the camera.

2. The foldable electronic device of claim 1, wherein the present FOV of the camera is adjusted further based on a detected posture of the first housing structure, posture of the second housing structure and the folding angle information.

3. The foldable electronic device of claim 1, wherein the foldable electronic device further includes a second display disposed on the fourth surface of the second housing structure.

4. The foldable electronic device of claim 1, wherein the processor is configured to:
   identify whether to correspond to at least one of predesignated photographing modes and then enter the predesignated photographing mode, and adjust a photographing direction of the camera.

5. The foldable electronic device of claim 4, wherein the processor is configured to:
   enter the first predesignated photographic mode, including displaying a preview image and a user interface (UI) associated with photographic capture on a first portion of the first display disposed on the first surface of the first housing structure, or a second portion of the first display disposed on the third surface of the second housing structure.

6. The foldable electronic device of claim 4, wherein the processor is configured to:
enter the first predesignated photographing mode and control a rotation range of the camera.

7. The foldable electronic device of claim 1, wherein the processor is configured to:
adjust the present FOV of the camera so as to face an interior of the first housing structure when the foldable electronic device is disposed in a folded state.

8. The foldable electronic device of claim 1, wherein the processor is configured to:
adjust the present FOV of the camera so as to face a direction opposite to an orientation of the first display, when the foldable electronic device is disposed in an unfolded state.

9. The foldable electronic device of claim 1, wherein the processor is configured to:
drive rotation of the camera in response to detecting selection to a portion of a UI associated with photographic capture.

10. The foldable electronic device of claim 1, wherein the processor is configured to:
drive rotation of the camera such that the FOV of the camera is oriented towards a user's face, when the function associated with photographic capture includes a selfie mode.

11. The foldable electronic device of claim 4, wherein the plurality of predesignated photographic modes include at least one mode for capturing a forward direction relative to a user's FOV, a downward direction relative to the user's FOV, and an upward direction relative to the user's FOV.

12. The foldable electronic device of claim 11, wherein the processor is configured to:
based on detecting the input:
detect, via the motion sensor, whether a posture of the second housing structure is parallel to the ground,
detect, via the folding angle sensor, whether the posture of the first housing structure faces downwards towards the ground,
determine whether the detected posture of the second housing structure and/or the detected posture of the first housing structure correspond to at least one of the predesignated photographic modes, so as to enter the first predesignated photographic mode,
drive rotation of the camera such that the FOV of the camera faces a forward orientation, and
display a preview image and a UI associated with photographic capture at least a first portion of the first display disposed on the first surface of the first housing structure.

13. The foldable electronic device of claim 11, wherein the processor is configured to:
based on detecting the input:
detect, via the motion sensor, whether a posture of the first housing structure is parallel to the ground,
detect, via the folding angle sensor, whether a posture of the second housing structure faces upwards away from the ground,
determine whether the detected posture of the second housing structure and/or the detected posture of the first housing structure correspond to at least one of the predesignated photographic modes, so as to enter the first predesignated photographic mode,
drive rotation of the camera such that the FOV of the camera faces a downward orientation,
display a preview image on at least a first portion of the first display disposed on the third surface of the second housing structure, and display a UI associated with photographic capture on at least a second portion of the first display disposed on the first surface of the first housing structure.

14. The foldable electronic device of claim 11, wherein the processor is configured to:
based on detecting the input:
detect, via the motion sensor, whether a posture of the second housing structure is parallel to the ground,
detect, via the folding angle sensor, whether a posture of the first housing structure faces upward away from the ground,
determine whether the detected posture of the second housing structure and/or the detected posture of the first housing structure correspond to at least one of the predesignated photographic modes, and
display a UI enabling selection of predesignated photographic modes determined to correspond to the detected posture of the second housing structure and/or the detected posture of the first housing structure, and based on detecting a selection thereof, entering a selected predesignated photographic mode.

15. The foldable electronic device of claim 11, wherein the processor is configured to:
when a forward photographic mode is selected from among the plurality of predesignated photographic modes, execute the forward photographic mode, including:
driving rotation of the camera such that the FOV of the camera faces a forward orientation, and displaying a preview image and a UI associated with photographic capture on at least a portion of the first display disposed on the first surface of the first housing structure, and
when a upwards photographic mode is selected among the plurality of predesignated photographic modes, execute the upwards photographic mode, including:
driving rotation of the camera such that the FOV of the camera faces an upward orientation, and displaying the preview image and the UI associated with photographic capture on at least a part of the first display disposed on the third surface of the second housing structure.

* * * * *